(12) United States Patent
Andriolo et al.

(10) Patent No.: US 11,561,554 B2
(45) Date of Patent: Jan. 24, 2023

(54) SELF-MOVING DEVICE, WORKING SYSTEM, AUTOMATIC SCHEDULING METHOD AND METHOD FOR CALCULATING AREA

(71) Applicant: Positec Power Tools (Suzhou) Co., Ltd, Suzhou (CN)

(72) Inventors: Paolo Andriolo, Vicenza (IT); Roberto Capanna, Vicenza (IT); Alessandro Berlato, Piovene Rocchette (IT); Davide Dalfra, Villimpenta (IT)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 67 days.

(21) Appl. No.: 17/037,261

(22) Filed: Sep. 29, 2020

(65) Prior Publication Data

US 2021/0132624 A1    May 6, 2021

Related U.S. Application Data

(63) Continuation of application No. PCT/EP2019/058108, filed on Mar. 29, 2019.

(30) Foreign Application Priority Data

Mar. 30, 2018 (CN) .......................... 201810291168.0

(51) Int. Cl.
*G05D 1/02* (2020.01)
*G01C 21/00* (2006.01)
(Continued)

(52) U.S. Cl.
CPC .......... *G05D 1/0276* (2013.01); *A47L 9/2852* (2013.01); *A47L 11/4011* (2013.01);
(Continued)

(58) Field of Classification Search
CPC .. G05D 1/0276; G05D 1/0219; G05D 1/0246; G05D 1/0221; A47L 9/2852;
(Continued)

(56) References Cited

U.S. PATENT DOCUMENTS 5,426,584 A * 6/1995 Kamimura ........... G01C 15/002
356/152.3
8,447,454 B2 * 5/2013 Biber .................... G05D 1/0272
701/25
(Continued)

FOREIGN PATENT DOCUMENTS

| CN | 103217912 A | 7/2013 |
| CN | 103324191 A | 9/2013 |

(Continued)

OTHER PUBLICATIONS

Office Action of Chinese Patent Office in Appl'n. No. 201910257324.6, dated Sep. 23, 2021.

*Primary Examiner* — Bhavesh V Amin
(74) *Attorney, Agent, or Firm* — Dentons US LLP

(57) ABSTRACT

An automatic working system comprises a self-moving device moving and working in a working region, a handheld device and a control module. The handheld device is configured to move along a perimeter of the working region with a user and comprises a detecting module, detecting the perimeter information of the working region; and an input module, receiving a command of the user for detecting the perimeter information. The control module comprises a perimeter setting unit, generating virtual data of the perimeter, an area calculation unit calculating the area of the working region and a scheduling unit generating a working schedule. The self-moving device comprises a working module, a driving module and a controller. The controller controls the self-moving device to work according to the working schedule.

20 Claims, 17 Drawing Sheets

(51) Int. Cl.
*A47L 9/28* (2006.01)
*A47L 11/40* (2006.01)
*G05B 19/19* (2006.01)
*A01D 34/00* (2006.01)
*A01D 101/00* (2006.01)

(52) U.S. Cl.
CPC ...... *A47L 11/4061* (2013.01); *G01C 21/3837* (2020.08); *G05B 19/19* (2013.01); *G05D 1/0219* (2013.01); *G05D 1/0246* (2013.01); *A01D 34/008* (2013.01); *A01D 2101/00* (2013.01); *A47L 2201/04* (2013.01); *G05B 2219/50393* (2013.01); *G05D 2201/0208* (2013.01)

(58) Field of Classification Search
CPC .............. A47L 11/4011; A47L 11/4061; A47L 2201/04; G01C 21/3837; G05B 19/19; G05B 2219/50393; G05B 2201/0208; G05B 2219/35349; A01D 34/008; A01D 2101/00; A01B 69/008
See application file for complete search history.

(56) References Cited

U.S. PATENT DOCUMENTS

| | | | |
|---|---|---|---|
| 2003/0236723 A1* | 12/2003 | Angott | A01D 34/008 705/34 |
| 2011/0125358 A1* | 5/2011 | Biber | G05D 1/0272 701/25 |
| 2015/0012164 A1* | 1/2015 | Yu | G05D 1/0274 701/23 |
| 2017/0131718 A1* | 5/2017 | Matsumura | H04N 5/332 |
| 2017/0273527 A1* | 9/2017 | Han | A47L 9/2805 |
| 2019/0265725 A1* | 8/2019 | Shao | G05D 1/0278 |
| 2019/0278269 A1* | 9/2019 | He | A01D 43/02 |
| 2019/0369620 A1* | 12/2019 | Zhou | G05D 1/0212 |
| 2021/0132624 A1* | 5/2021 | Andriolo | G05D 1/0246 |

FOREIGN PATENT DOCUMENTS

| | | |
|---|---|---|
| EP | 2946650 A1 | 11/2015 |
| EP | 3018548 A1 | 5/2016 |
| WO | WO2014/145996 A1 | 9/2014 |
| WO | WO2015/039621 A1 | 3/2015 |

* cited by examiner

SELF-MOVING DEVICE, WORKING SYSTEM, AUTOMATIC SCHEDULING METHOD AND METHOD FOR CALCULATING AREA

This application is a continuation of International Application No. PCT/EP2019/058108, filed on Mar. 29, 2019, which claims the benefit of Chinese Patent Application No. 201810291168.0, filed on Mar. 30, 2018, the contents of which are all hereby incorporated by reference herein in their entirety.

BACKGROUND

Technical Field

The present invention relates to a self-moving device, a working system, an automatic scheduling method, and a method for calculating an area.

Related Art

With the continuous advancement of science and technology, various self-moving devices, or robots, have started to slowly enter people's lives, for example, an automatic dust collector, an automatic mower, etc. Such a self-moving device has a moving device, a working device, and an automatic control device, such that the self-moving device does not require operation by a person and automatically moves and works in a certain range. When the energy of an energy storage device of the self-moving device is insufficient, it can be automatically returned back to a charging station for charging and then continues to work. The self-moving device liberates people from the tedious and time-consuming and labor-consuming household duties such as house cleaning and lawn trimming, saves time for people and brings convenience to people's lives.

However, it is relatively complex to control the robot. When the self-moving device is used for the first time, the user needs to input a series of commands, such that the self-moving device can start to work correctly. For example, the user needs to set a working region, set working time, set a working mode, etc. However, such commands are often hard to set, particularly, for the self-moving device with more functions or the self-moving device capable of presetting a working plan by programming, the user needs to search for the corresponding programs in massive menus and set complex steps. In addition, when the use environment of the self-moving device is changed, the user needs to perform the above settings again, which causes inconvenience to the user.

Patent CN103217926B is referred to and discloses a method for the self-moving device to obtain a working plan according to a working area, the self-moving device moves from a starting point and moves along a perimeter of the working region, and returns back to the starting point, the track information in the moving information is recorded, and the working area is calculated according to the track information. However, if the working plan is obtained by calculating the working area through such manner, in one aspect, the self-moving device is relatively complex, not only is a detection device for track recording required to be mounted in the self-moving device, but also corresponding programs need to be pre-stored; in the other aspect, the operation of operating and controlling the self-moving device to move along the working region is relatively complex, and a person needs to push the self-moving device to move or the self-moving device is operated to automatically move by presetting the programs again.

Therefore, it is desirable to design a self-moving device, a working system thereof, an automatic scheduling method thereof, and a method for calculating an area thereof. Some of the devices, systems and methods described here are directed to this goal and others are aimed at solving other problems.

SUMMARY

In view of this, an objective of some embodiments of the present invention is to provide a self-moving device which is low in cost and simple to operate, a working system therefor, an automatic scheduling method therefor, and a method for calculating an area therefor.

Compared with prior art, some embodiments of the present invention have the beneficial effects: the area of the working region is automatically obtained by causing a handheld device to move along a perimeter of the working region with the user, and a working schedule is automatically set according to the area of the working region, the working of the self-moving device is automatically controlled, and the automatic working system is rendered more intelligent.

BRIEF DESCRIPTION OF THE DRAWINGS

The present invention is further explained in combination with the drawings and the embodiments in the following.

DETAILED DESCRIPTION

The present invention is explained in detail in combination with the drawings and specific embodiments, by way of example only.

Figure 1:
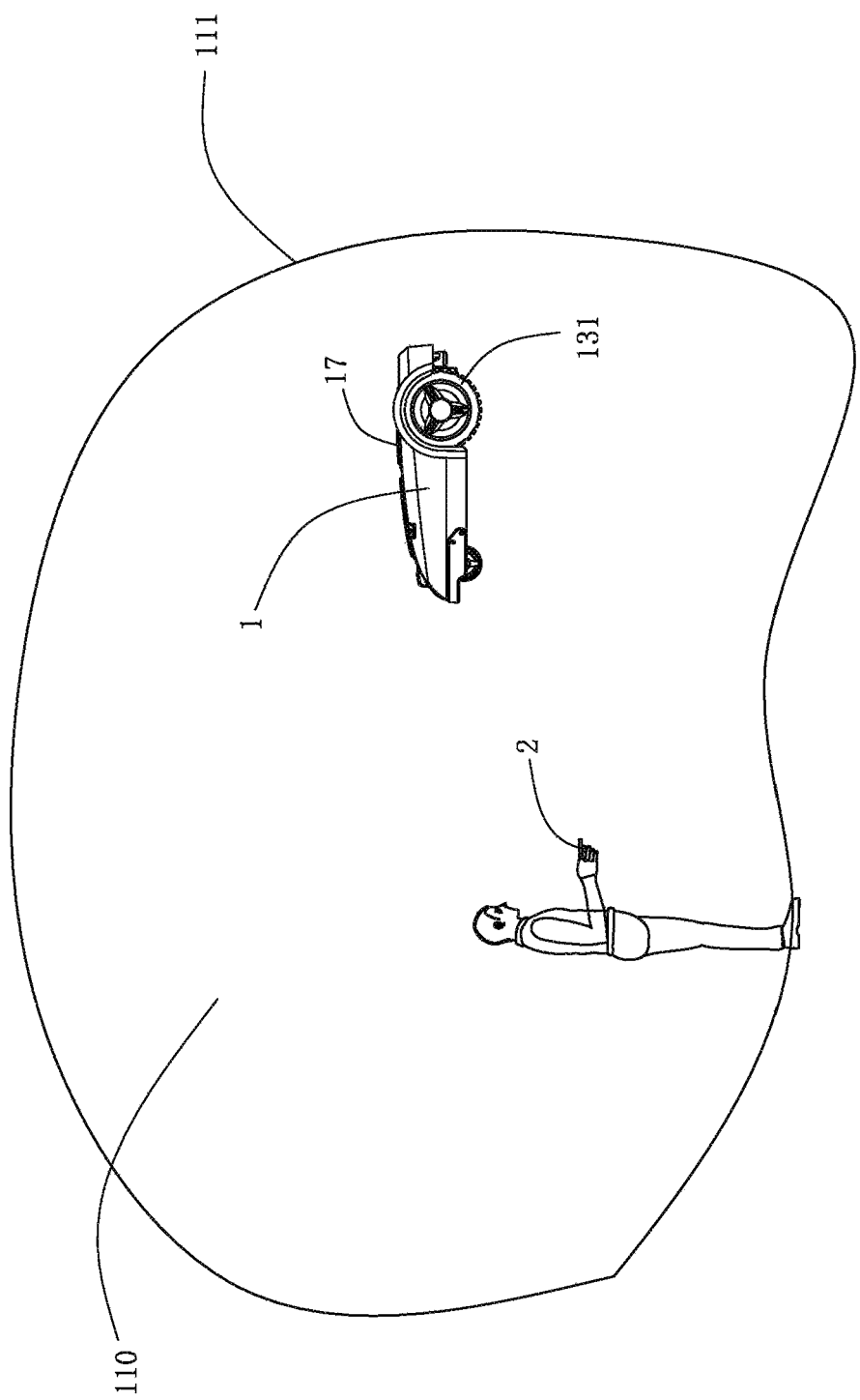
FIG. 1 is a schematic diagram of an automatic working system according to some embodiments of the present invention.

Referring to FIG. 1, which shows an automatic working system according to some embodiments of the present invention, the automatic working system 100 comprises a self-moving device 1 that moves and works in a working region 110, a handheld device 2, and a control module 3. The working region 110 is defined by a perimeter 111. The self-moving device 1 may be an automatic mower or an automatic dust collector or any other self-moving device. They automatically move on the lawn or on the ground to mow the lawn or collect the dust. Of course, the self-moving device 1 is not limited to the automatic mower and the automatic dust collector, and may also be other types of devices, such as an automatic spraying device or an automatic monitoring device. The self-moving device can realize unattended operation of various tasks.

Referring to FIGS. 2 to 5, the handheld device 2 may be moved along the perimeter 111 of the working region with the user. Specifically, the handheld device 2 may be any handheld device including but not limited to a mobile phone, a camera, or a laptop, for example a mobile phone with built-in AR characteristics, such as an iphone 6s and the above models with the ios system. In other embodiments, the handheld device 2 may also be replaced with non-handheld smart devices, for example, a smart device that moves along the perimeter, or is driven by people or other objects in a non-handheld manner to move along the perimeter, so as to achieve the corresponding functions.

Figure 2:
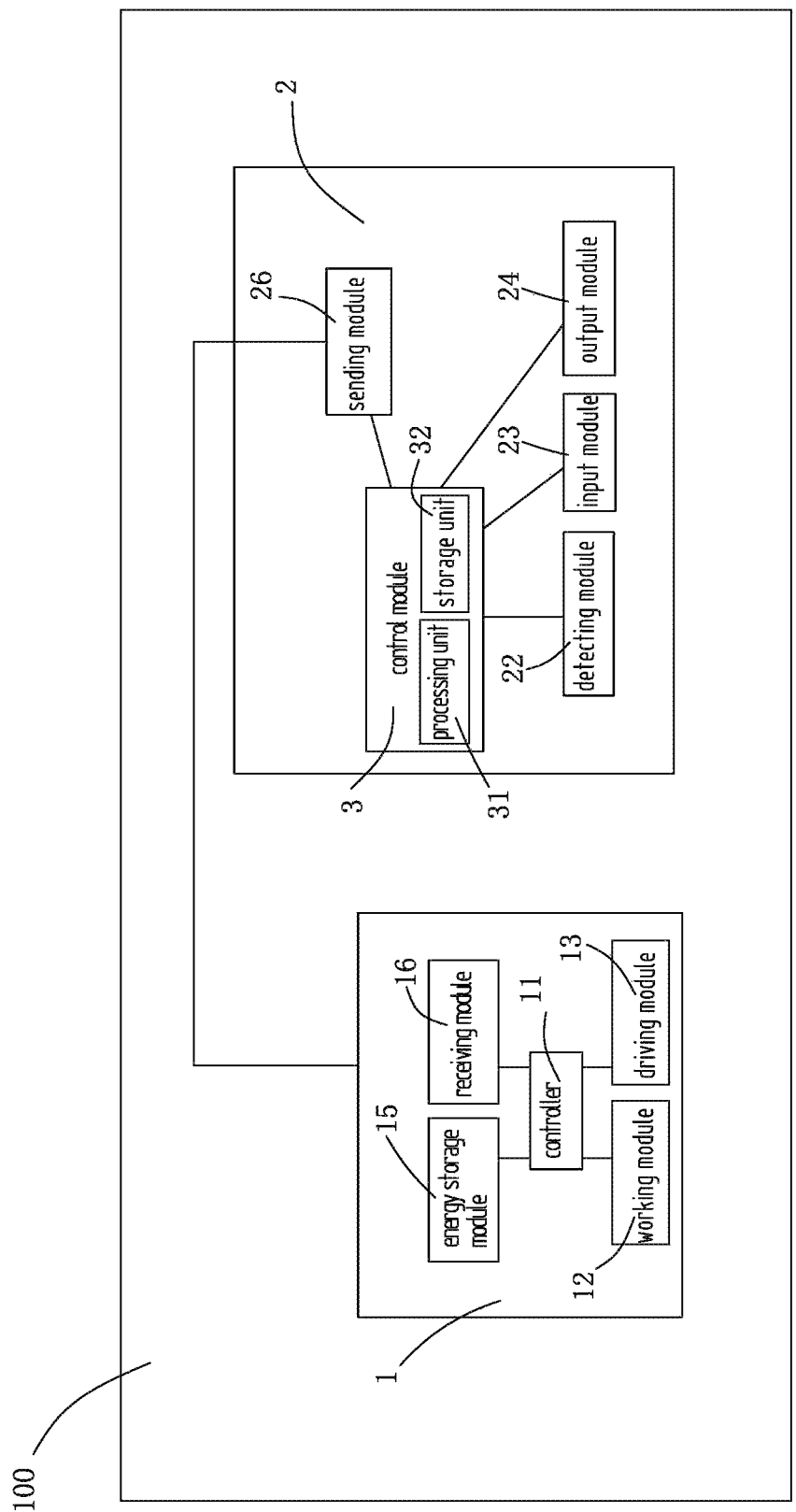
FIG. 2 is a module schematic diagram of an automatic working system according to some embodiments of the present invention.

The embodiment of handheld device 2 of FIG. 2 comprises a detecting module 22, an input module 23, and an output module 24. The detecting module 22 is configured to detect the perimeter information of the working region 110 during the movement of the handheld device. The input module 23 is configured to receive a command from the user to detect the perimeter information. The control module 3 is shown in more detail in FIG. 4 and comprises a perimeter setting unit 37, an area calculation unit 38, and a scheduling unit 39. The perimeter setting unit 37 sets virtual data of the perimeter based on perimeter information, and the virtual data comprises data representing the shape and size of the perimeter. The area calculation unit 38 calculates the area of the working region based on the virtual data of the perimeter. The scheduling unit 39 sets a working schedule based on at least the area of the working region 110.

In one embodiment, the detecting module 22 comprises a camera disposed on the handheld device 2. The camera is used for capturing images of the perimeter 111 during the movement of the handheld device 2. The perimeter setting unit 37 sets the virtual data of the perimeter 111 according to the related information of the pictures of the perimeter 111 and the command of the user. Specifically, during the movement of the handheld device 2 along the perimeter 111, the perimeter setting unit 37 may record the perimeter by setting mark points along the path, described in more detail below with reference to FIG. 6, and the related information of the pictures of the perimeter comprises the focus lengths of the pictures and the position difference of mark points on multiple pictures. The distance from the handheld device 2 to the ground may be calculated by the focus length of the camera, and then the length and angle of a line between two adjacent mark points may be calculated according to the distance from the handheld device 2 to the ground. More specifically, according to some embodiments of the invention, the distance from the handheld device 2 to the ground may be calculated by the focus length of the camera, the movement variables of a plurality of feature points on the perimeter of the working region may be calculated, and the posture of the handheld device during the movement may be calculated based on the movement variables of the plurality of feature points. According to the posture of the handheld device during the movement, the length and angle of the line between two adjacent mark points may be calculated. In one embodiment, the perimeter setting unit 37 updates the distance from the handheld device 2 to the ground according to a preset pattern to detect whether the handheld device moves in the same plane to reduce errors.

Figure 5:
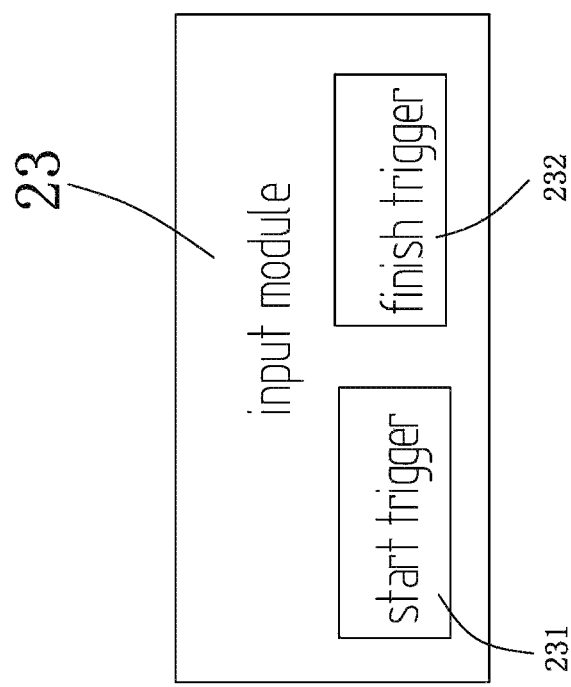
FIG. 5 is a schematic diagram of an input module according to some embodiments of the present invention.

In one embodiment shown in FIG. 5, the input module 23 comprises a start trigger 231 and a finish trigger 232. The start trigger 231 is configured to receive user input to command recording a starting mark point of a perimeter picture, and the finish trigger 232 is configured to receive user input to command recording a last mark point of a perimeter picture and/or ending recording the mark point of the perimeter picture. For example, in one embodiment, the finish trigger 232 is configured to receive user input to command ending recording the mark point of the perimeter picture, the user may operate the start trigger 231, whereby the start trigger 231 receives a starting command of the user, marks a first mark point and automatically starts to record subsequent mark points; the user may operate the finish trigger 232, whereby the finish trigger 232 receives an ending command of the user and ends automatically recording the mark point of the perimeter picture, and uses the last automatic mark point before the user operates the finish trigger 232 as the last mark point. Alternatively, the user may operate the start trigger 231, and the start trigger 231 receives the starting command of the user, marks the first mark point and starts to automatically record subsequent mark points; the user may operate the finish trigger 232, and the finish trigger receives the ending command of the user, ends automatically recording the mark points of the perimeter pictures, and marks the last mark point while the finish trigger 232 is operated. The above are example implementations of embodiments of the present invention. In other embodiments, when the user operates the start trigger 231 and the finish trigger 232, the corresponding specific action may be adjusted according to the actual situation. The start trigger 231 and the finish trigger 232 may be implemented in various ways, for example through the use of soft keys on a display screen of a user device. It will be appreciated that it is not necessary to provide separate keys for start and stop. For example a first operation of a key may generate a start command and a second operation of the same key may generate a finish command.

Figure 8:
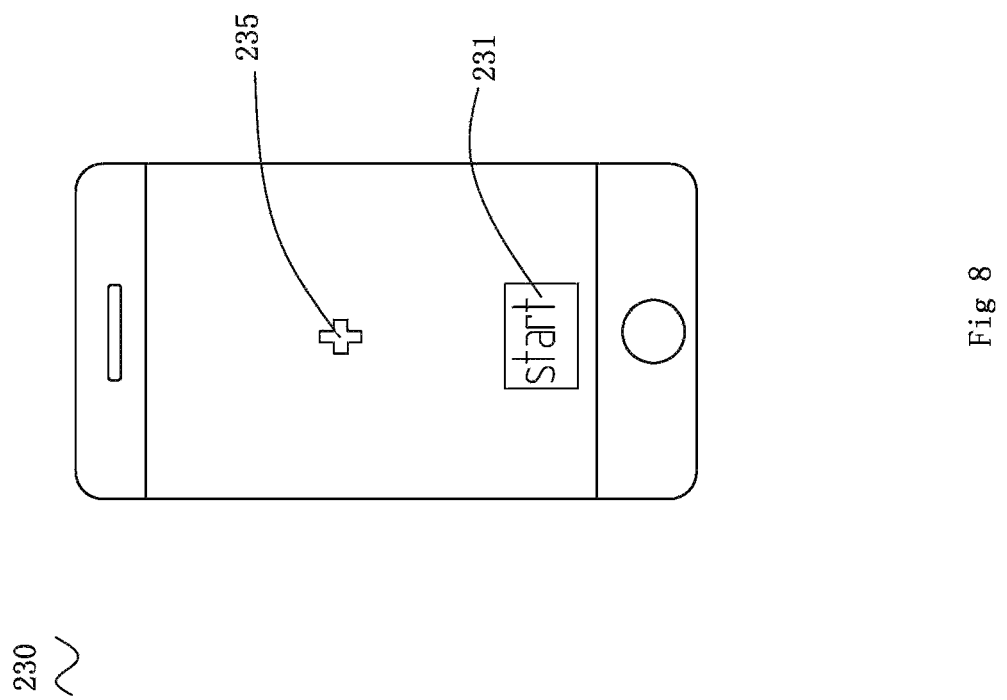
FIG. 8 is a schematic diagram of an interface of a display according to some embodiments of the present invention.
Figure 9:
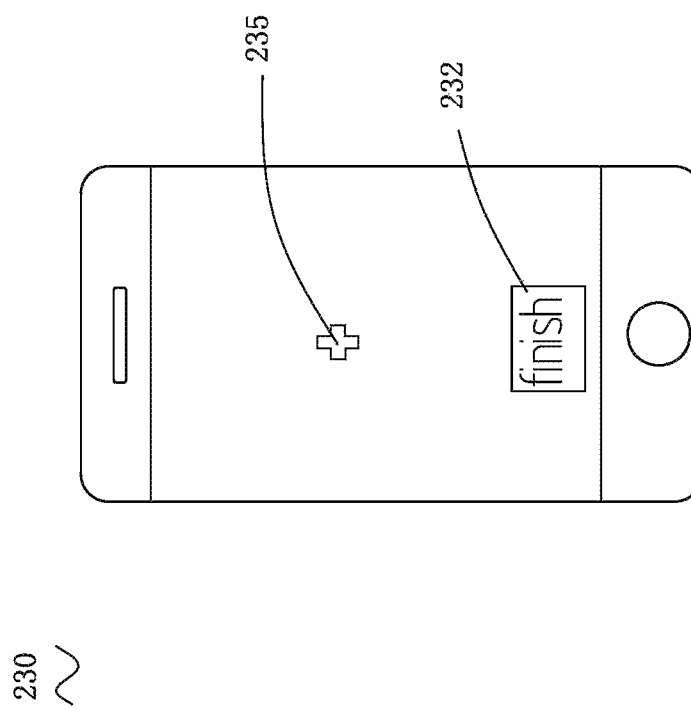
FIG. 9 is a schematic diagram of an interface of a display according to some embodiments of the present invention.

Referring now to FIGS. 8 and 9, the output module 24 may comprises a display 230 for displaying the perimeter 111, the start trigger 231, and the finish trigger 232. When the user turns on the handheld device 2 and the camera of the handheld device 2 captures pictures of the perimeter, the positions of the first mark point and the last mark point can be determined by the display 230. In some embodiments of the invention, the user may turn on the handheld device 2 and capture images of the perimeter using the camera of the handheld device 2, the perimeter pictures are displayed on the display 230, and a current position indication mark of the current position of the user or the current position of the camera is marked on the display 230 for indicating the specific position of the user in the perimeter pictures to the user, the user acquires the real-time position in the perimeter pictures displayed on the display 230 through the current position indication mark 235, thereby facilitating the user to select the first mark point, that is, when the current position indication mark 235 and the position of the first mark point that the user wants to set overlap, the start trigger 231 is triggered, the first mark point is marked, and automatic generation of subsequent mark points is started. The pictures of the perimeter, a button of the start trigger, and a button of the finish trigger may be displayed on the display. As shown in the examples of FIGS. 8 and 9, in the present embodiment, the button of the start trigger and button of the finish trigger, i.e., the "start" button and the "end" button in FIGS. 8 and 9 take the form of virtual buttons on the screen. In other embodiments, the button of the start trigger and the button of the finish trigger may also be buttons located outside the screen and the like.

Figure 6:
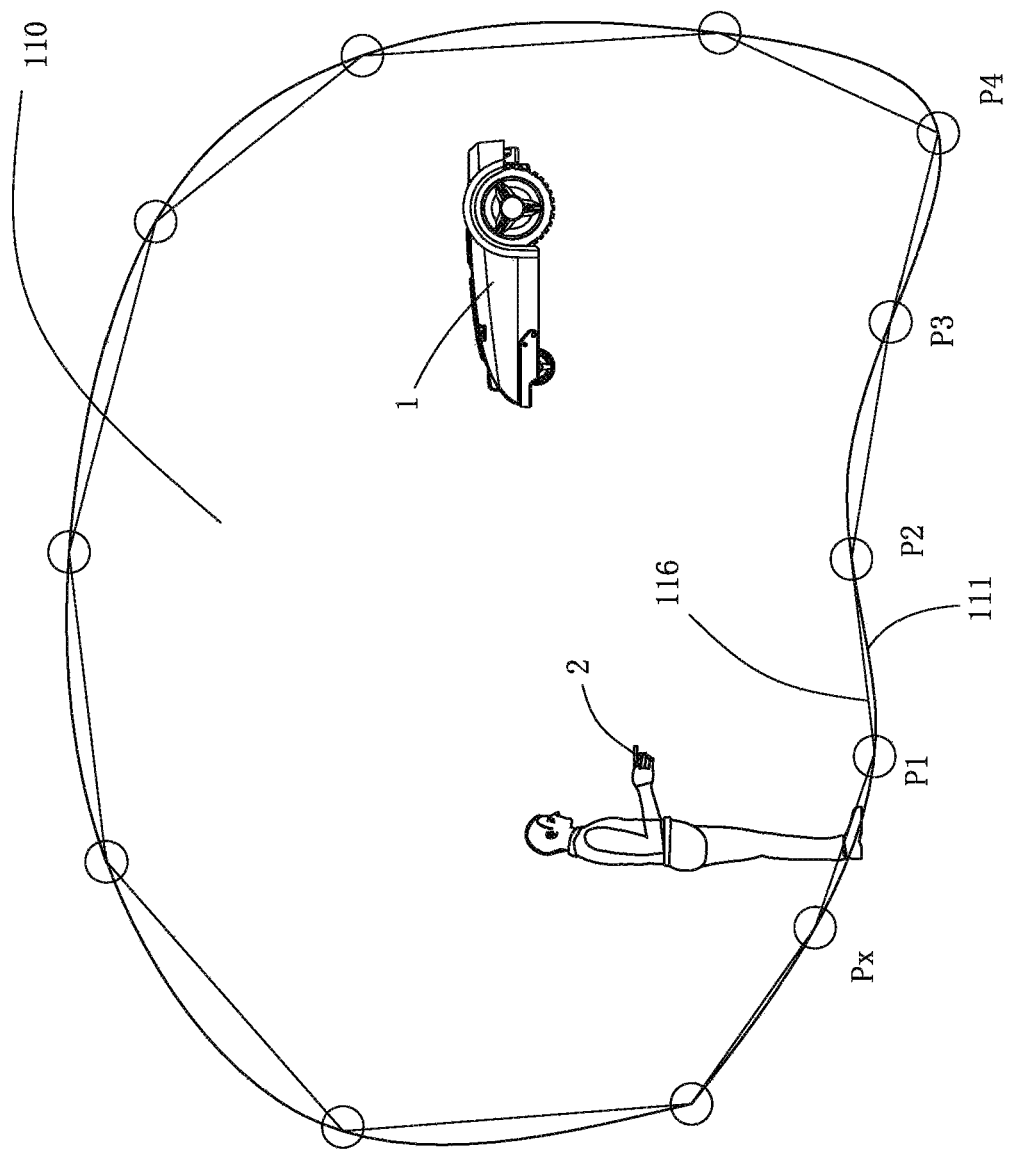
FIG. 6 is a schematic diagram when a first mark point and a last mark point in an automatic working system are in different positions according to some embodiments of the present invention.

In some embodiments, as shown in FIG. 6, at the beginning, the user operates the button of the start trigger on the display at the starting point, and records the first mark point P1 of the perimeter picture, the user holds the handheld device 2 to move along the perimeter 111, the perimeter setting unit 37 starts to automatically set a plurality of mark points P2, P3 . . . Pn according to a preset pattern, for example at intervals, the recording of the mark points is ended when the user operates the button of the finish trigger on the display, the last mark point before the user operates the finish trigger is called as the last mark point Px, and the perimeter setting unit 37 connects all the adjacent points to each other while connecting the first mark point P1 and the last mark point Px to form a closed perimeter picture. Specifically, the abovementioned preset pattern may be predetermined time and/or predetermined distance, that is, the perimeter setting unit 37 starts to automatically set a plurality of mark points every predetermined time and/or every predetermined distance.

In some embodiments, when the user selects a start trigger, for example, when the user is located in a location shown in FIG. 6, the display 230 displays a current image which the handheld device is capturing, namely Point P1 and near Point P1 shown in FIG. 6, at this time, the current position indication mark 235 is located at Point P1, when the user confirms that the position of the point P1 is a starting point, the user operates the start trigger 231 at the moment, the display 230 displays a mark at the position of the point P1, to mark the first mark point P1. The user moves along the boundary with a handheld device 2 after the first mark point is selected, during the movement, the display 230 displays the current image it has captured in a real time, the current position indicator 235, and an automatically generated marker (P2, P3 . . . Pn) along the way, and displays the generated line of two adjacent marker points. During the movement, the user may adjust the shooting angle of the handheld device 2, for example, moving the camera of the handheld device toward the position of the first mark point, to display the first mark point P1 on the display 230, and to get a distance and a relationship between the current position and the first mark point, for selecting a time to operate the finish trigger 232. For example, when the user moves to near the point Px shown in FIG. 6, the current location indicate mark 235 on the display 230 is located between the point Px and point P1 (including Px and P1). At this moment, the current position indication mark 235 is near to Point P1, the user operates the finish trigger 232, to determine point Px shown in FIG. 6 is a last mark point, and then generating a line connecting the point Px and the point P1 on the display 230, for displaying a complete image of the boundary 116 shown in FIG. 6.

Figure 7:
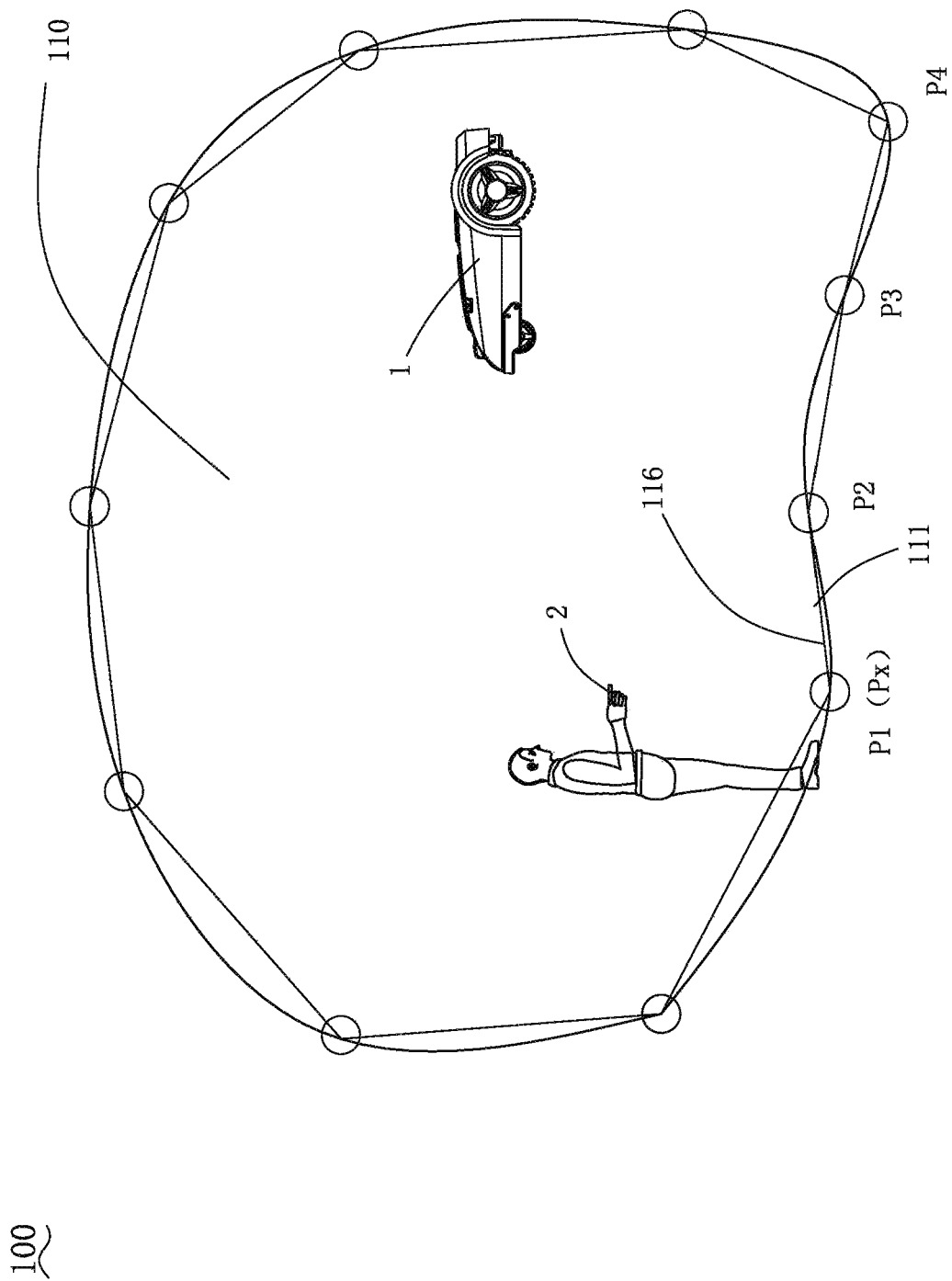
FIG. 7 is a schematic diagram when a first mark point and a last mark point in an automatic working system are overlapped according to some embodiments of the present invention.

In this embodiment, the last marker point is the last mark point Px before operating the finish trigger 232. In other embodiments, the last marker point is a point marked after operating the finish trigger 232, in other words, while operating the finish trigger 232, the current position indicator 235 is located at the last marker point Px. In this embodiment, the user can choose a time point when the current position indicator 235 is near to or overlaps with the first mark point P1 to operate the finish trigger 232, and/or the user can choose a time point when a real boundary 111 between the first mark point P1 and the last mark point Px is a straight line to operate the finish trigger 232, for decreasing the error between the boundary image 116 and the real boundary 111. In another embodiment, the finish trigger 232 is configured to receive user input to command recording a last mark point of a perimeter picture and ending recording the mark point of the perimeter picture. As shown in FIG. 7, at the beginning, the user operates the button of the start trigger 231 on the display at the starting point, and records the first mark point P1 of the perimeter pictures, the user holds the handheld device 2 to move along the perimeter 111, the perimeter setting unit 37 starts to automatically set a plurality of mark points P2, P3 . . . Pn according to a preset pattern at an interval, the button of the finish trigger on the display is operated when the user reaches the ending point, the last mark point Px of the perimeter pictures is recorded, and the perimeter setting unit 37 connects all the adjacent points to each other while connecting the first mark point P1 and the last mark point Px to form a closed perimeter picture. The way to select the ending point Px can be similar to the way of selecting said starting point P1. For example, when the current position indication mark and the position of the last mark point that the user wants to set overlap, the finish trigger 231 is triggered to mark the last mark point. The abovementioned preset pattern may be predetermined time and/or predetermined distance, that is, the perimeter setting unit 37 starts to automatically set a plurality of mark points every predetermined time and/or every predetermined distance. In the present embodiment, the first mark point P1 and the last mark point Px are overlapping points. In another embodiment, it may be also as shown in FIG. 6, the first mark point P1 and the last mark point Px do not overlap, and may be in adjacent positions, that is, the starting point and the ending point are at the same position on the perimeter or the adjacent positions of the perimeter, or a maximum of the distance between the starting point and the ending point is defined, as long as the distance between the starting point and the ending point is not greater than the maximum of the distance. In an optional range, the smaller the distance between the starting point and the ending point is, the closer the perimeter picture 116 is to the real perimeter 111, and the more accurate the calculated area of the working region defined by the perimeter is, similarly, the smaller the distance between the two adjacent mark points is, the closer the perimeter picture 116 is to the real perimeter 111, and the more accurate the calculated area of the working region defined by the perimeter is. In addition, when the area is calculated, the area of the working region defined by the perimeter is calculated by directly connecting the first mark point and the last mark point into a straight line. Therefore, if the perimeter between the starting point and the ending point is a straight line or close to a straight line, no matter how far the starting point is from the ending point, the perimeter picture 116 is very close to the real perimeter 111 and the calculated area is relatively accurate. In other words, the closer the perimeter between the starting point and the ending point is to a straight line connecting the two points, the closer the perimeter picture 116 is to the real perimeter 111, and the more accurate the calculated area of the working region defined by the perimeter is.

Figure 10:
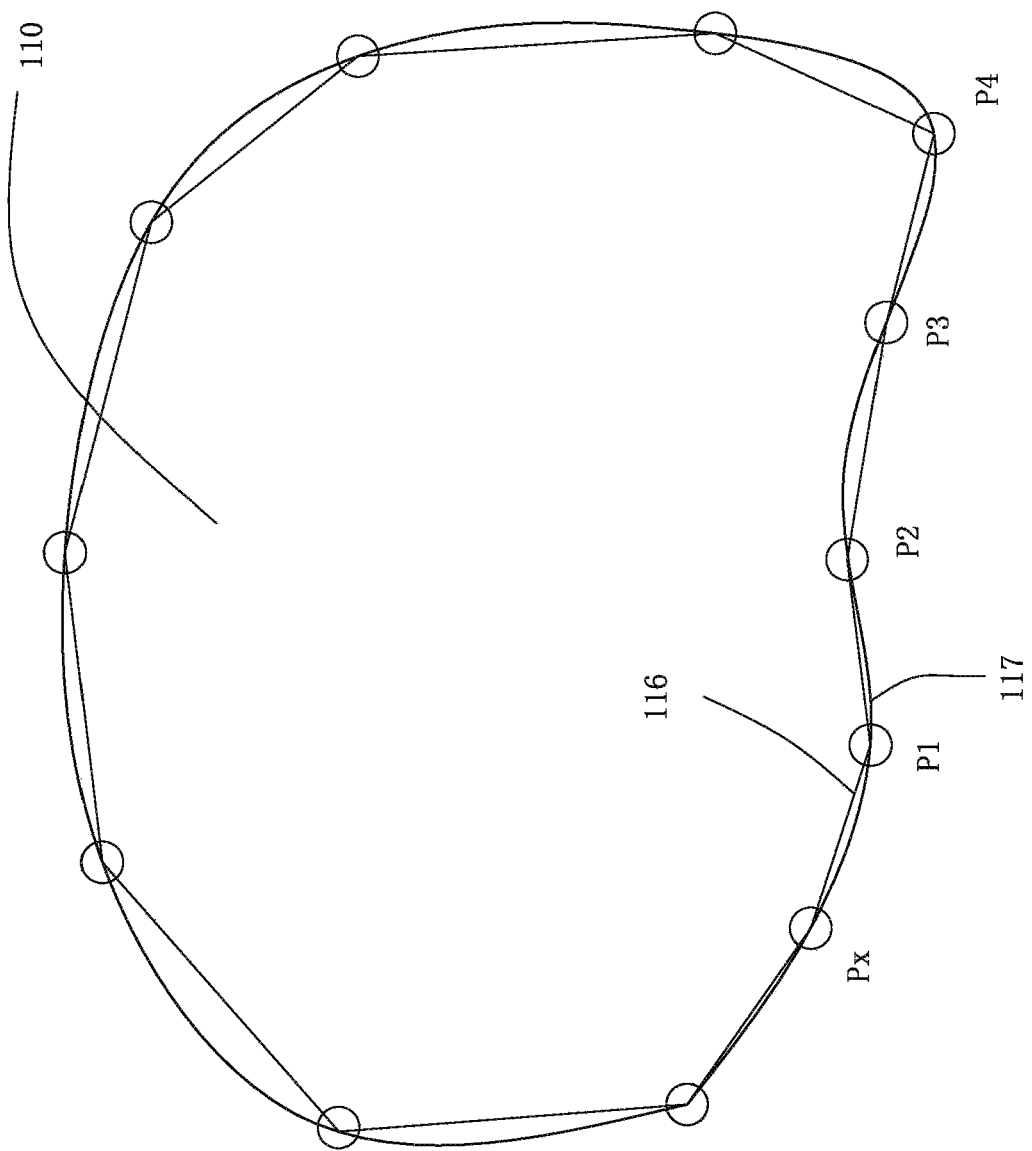
FIG. 10 is a principle schematic diagram of perimeter pictures on a display according to some embodiments of the present invention.

As shown in FIG. 10, in the present embodiment, the perimeter picture 116 is a polygon picture formed by connecting adjacent mark points to each other. In other embodiments, in order for the aesthetic appearance of the presented picture and improve the sense of reality of the use experience, as shown in FIG. 10, the adjacent mark points are usually connected with a smooth curve on the display, so that the perimeter picture 117 displayed on the display is closer to the shape of the real perimeter. The perimeter picture 117 may be still calculated according to the virtual perimeter picture 116.

In the above embodiment, by directly detecting the perimeter through a camera, the data representing the shape and size of a perimeter are acquired, and other detection modes, such as the mode of satellite coordinate positioning, for acquiring the data representing the shape and size of the perimeter, are avoided. Due to trees or other obstacles, the positioning accuracy achievable using satellite positioning for example is low, and the final calculation result is lower than the accuracy of this solution. In addition, in the present embodiment, by displaying the corresponding features on the display, when the user operates, by combining the virtuality and the reality, the sense of reality and sense of integration of the use experience will be multiplied, thereby improving the use experience.

In the present embodiment, the distance between the handheld device and the ground is calculated by the focus length of the camera of the handheld device 2, and the relative position during the movement of the handheld device 2 is further calculated to calculate the position of each point on the perimeter 111, and the virtual data related to the perimeter 111 are formed to calculate the area of the working region 120 defined by the perimeter 111. In order to ensure the accuracy of the data and reduce the calculation error, the handheld device 2 must be in a predetermined orientation, e.g. horizontal state, during the movement of the handheld device 2 along the perimeter 111. In order to achieve the above purpose, the handheld device 2 further comprises a reminding module for reminding the user whether the handheld device 2 is horizontal or in another predetermined orientation during the movement. For example, when the handheld device 2 is not placed e.g. horizontally during the movement, the reminding module may remind the user, for example, reminds the user through vibration. Of course, the user may also be reminded by other manners such as voice, messages or pictures.

In another embodiment, the detecting module 22 comprises a positioning unit, and the positioning unit is used to detect the coordinates of the handheld device 2 during the movement. The positioning unit may comprise any suitable apparatus including but not limited to at least one of a satellite positioning apparatus, an inertial navigation apparatus, an electronic compass, a gyroscope, and the like. The satellite positioning apparatus may comprise a GPS positioning device or a Beidou positioning device for example. In one embodiment, the positioning unit comprises a GPS positioning device and an inertial navigation apparatus. The handheld device 2 obtains the coordinate information of the handheld device 2 during the movement through the GPS positioning device and the inertial navigation apparatus, because the GPS accuracy is relatively low, usually, the absolute position of the handheld device 2 during movement is firstly located through the GPS, then the relative position of each waypoint during the movement of the handheld device 2 is obtained through the inertial navigation apparatus, and the relatively accurate coordinate information of the handheld device 2 during the movement is obtained by combining the GPS positioning device and the inertial navigation apparatus. In some embodiments, as shown in FIG. 7, during the movement of the handheld device 2 along the perimeter 111, the perimeter setting unit 37 records the perimeter by setting the mark points along the way. The perimeter setting unit 37 sets the virtual data of the perimeter according to the coordinate information of the handheld device 2 in the moving process. The virtual data comprise the data representing the shape and size of the perimeter. For example, the virtual data comprise the position coordinates of each mark point. The area calculation unit in the control module 3 calculates the area of the working region defined by the perimeter according to the position coordinates of each mark point; and the scheduling unit 39 automatically sets the working schedule at least based on the area of the working region.

Figure 3:
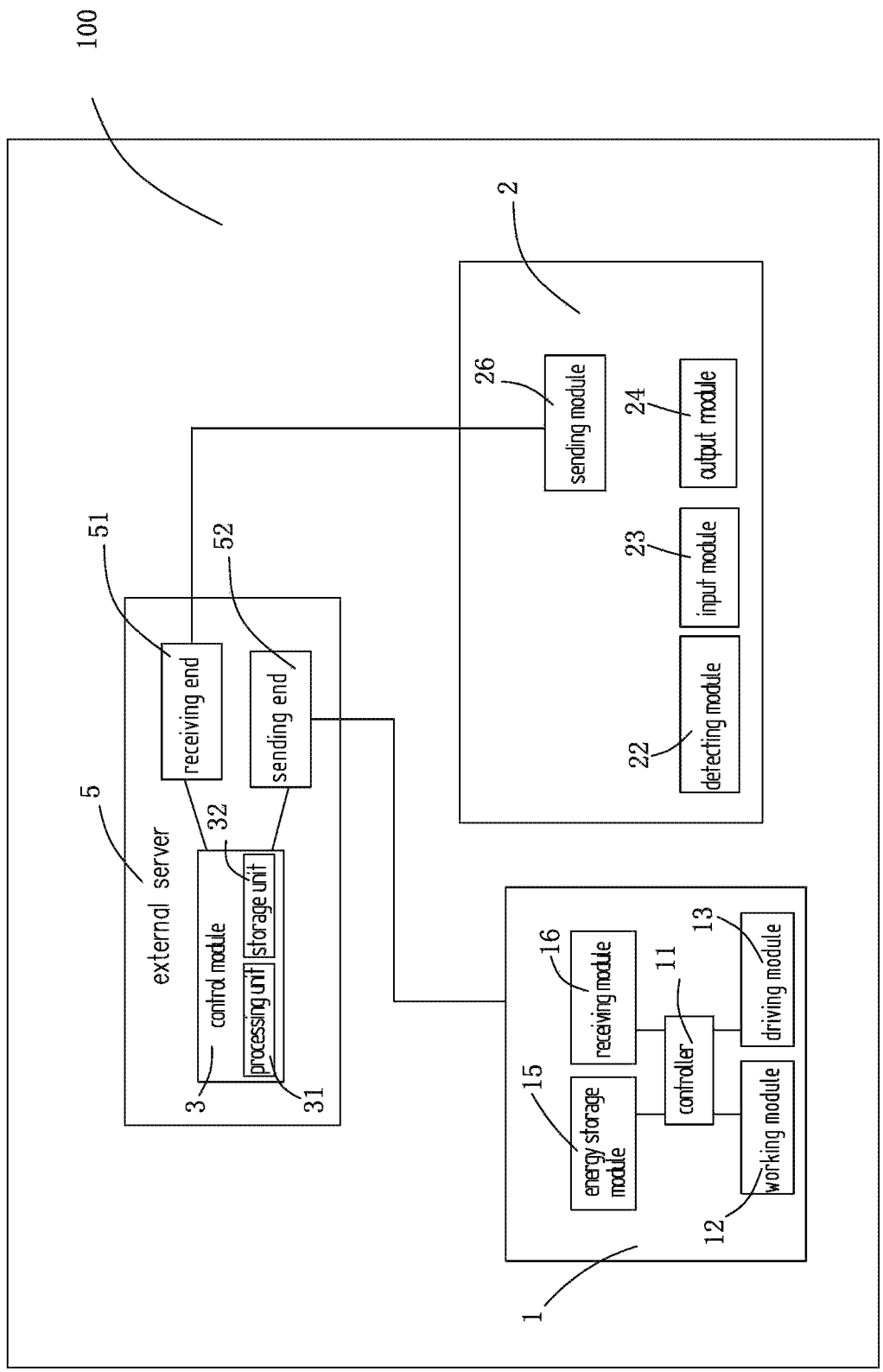
FIG. 3 is a module schematic diagram of an automatic working system according to some embodiments of the present invention.
Figure 4:
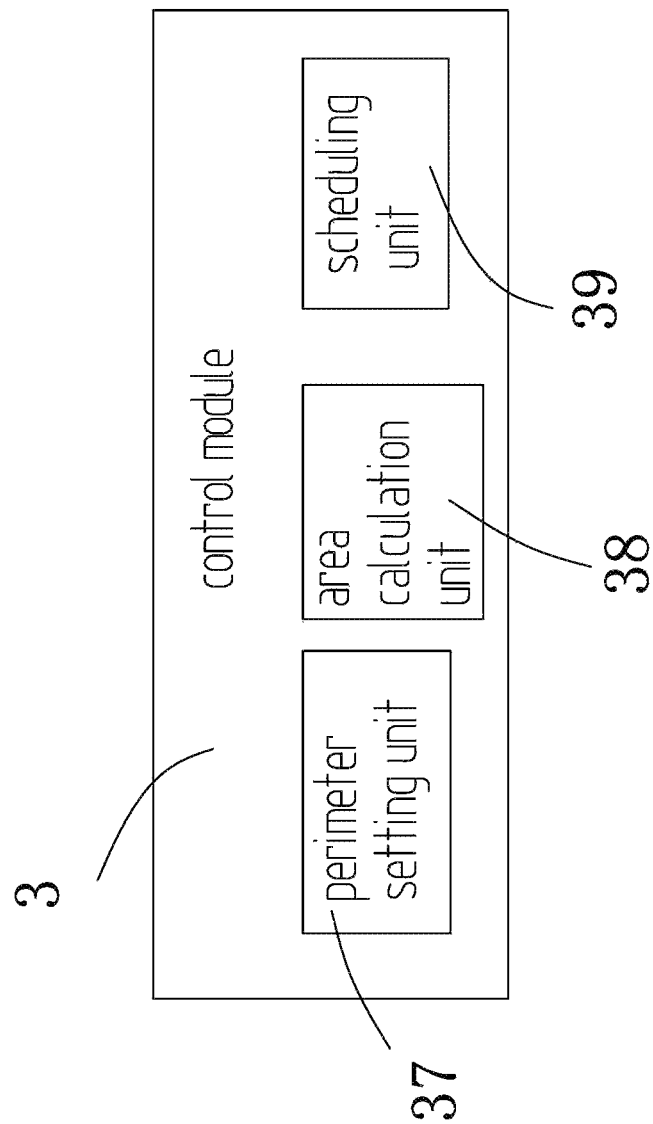
FIG. 4 is a schematic diagram of a control module according to some embodiments of the present invention.

The working schedule of the self-moving device 1 refers to the plan of the working time of the self-moving device 1 in the working region 110, for example, the working starting time, the working cycle, the working ending time, and the like. Specifically, for example, in the embodiment, in the working region of 1000 square meters, an example working schedule is: the total working time is 35 hours, and the working is performed during the two periods of 9:00-12:00 and 16:00-20:00 every day. Of course, the above is only an example. Specifically, the control module 3 may calculate the area of the working region according to a preset area algorithm, and make the working time plan according to a preset scheduling algorithm, and automatically set the working schedule. In one embodiment, as shown in FIG. 2, the control module 3 may be partially or fully integrated in the handheld device 2. In another embodiment, as shown in FIG. 3, the control module 3 may be partially or fully installed in an external server 5. Of course, in other embodiments, the control module 3 may also be partially or fully disposed at other positions in the self-moving device 1 or the automatic working system 100.

As shown in FIG. 3, the control module 3 may comprise a processing unit 31 and a storage unit 32. The processing unit 31 is configured to set the virtual data of the perimeter according to the information of the perimeter of the working region detected by the detecting module, and calculate the area of the working region according to the virtual data. The area of the working region may be calculated according to the data representing the shape and the size of the perimeter, and based on the area of the working region, the working schedule of the self-moving device 1 may be set. In one embodiment, the preset area algorithm may be a mathematical formula for calculating the area of the polygon stored in the storage unit 32, or a preset function with the virtual data as variables, and the processing unit 31 calculates the area of the working region according to the virtual data. Of course, the above is only an example. Specifically, the method for calculating the area of the working region by the processing unit 31 may be determined according to a specific situation.

Figure 11:
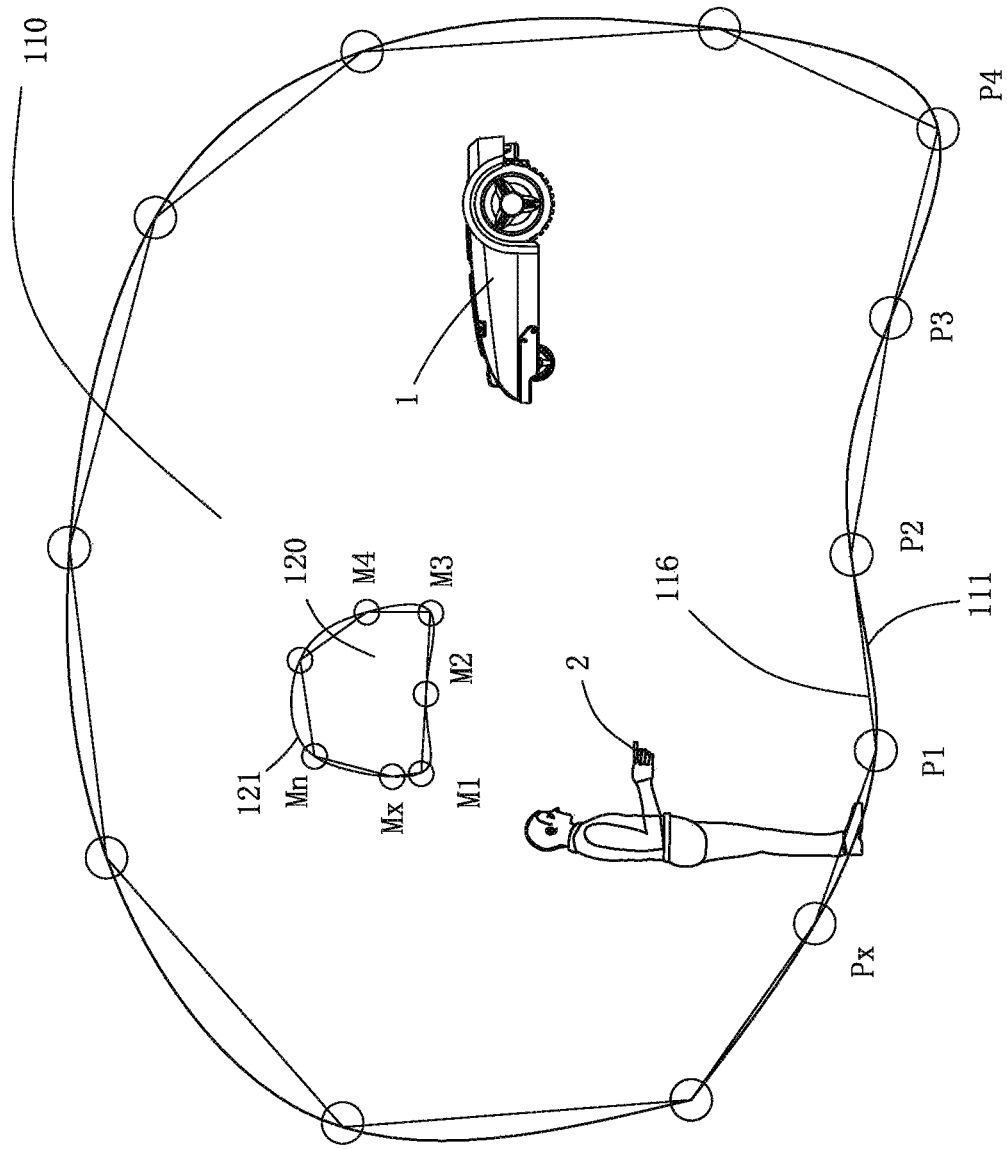
FIG. 11 is a schematic diagram of an automatic working system having a nonworking region according to some embodiments of the present invention.
Figure 12:
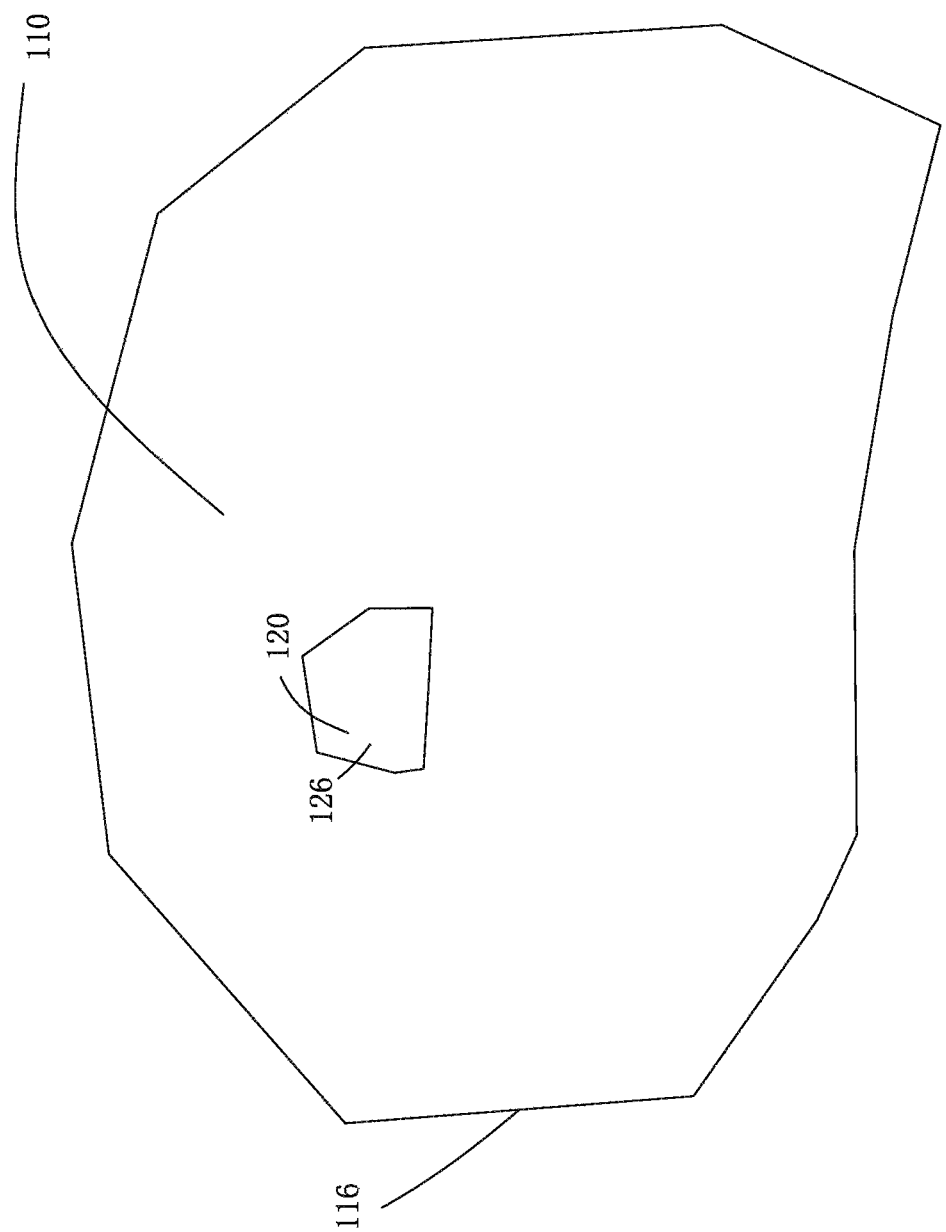
FIG. 12 is a schematic diagram of perimeter pictures on a display according to some embodiments of the present invention.
Figure 13:
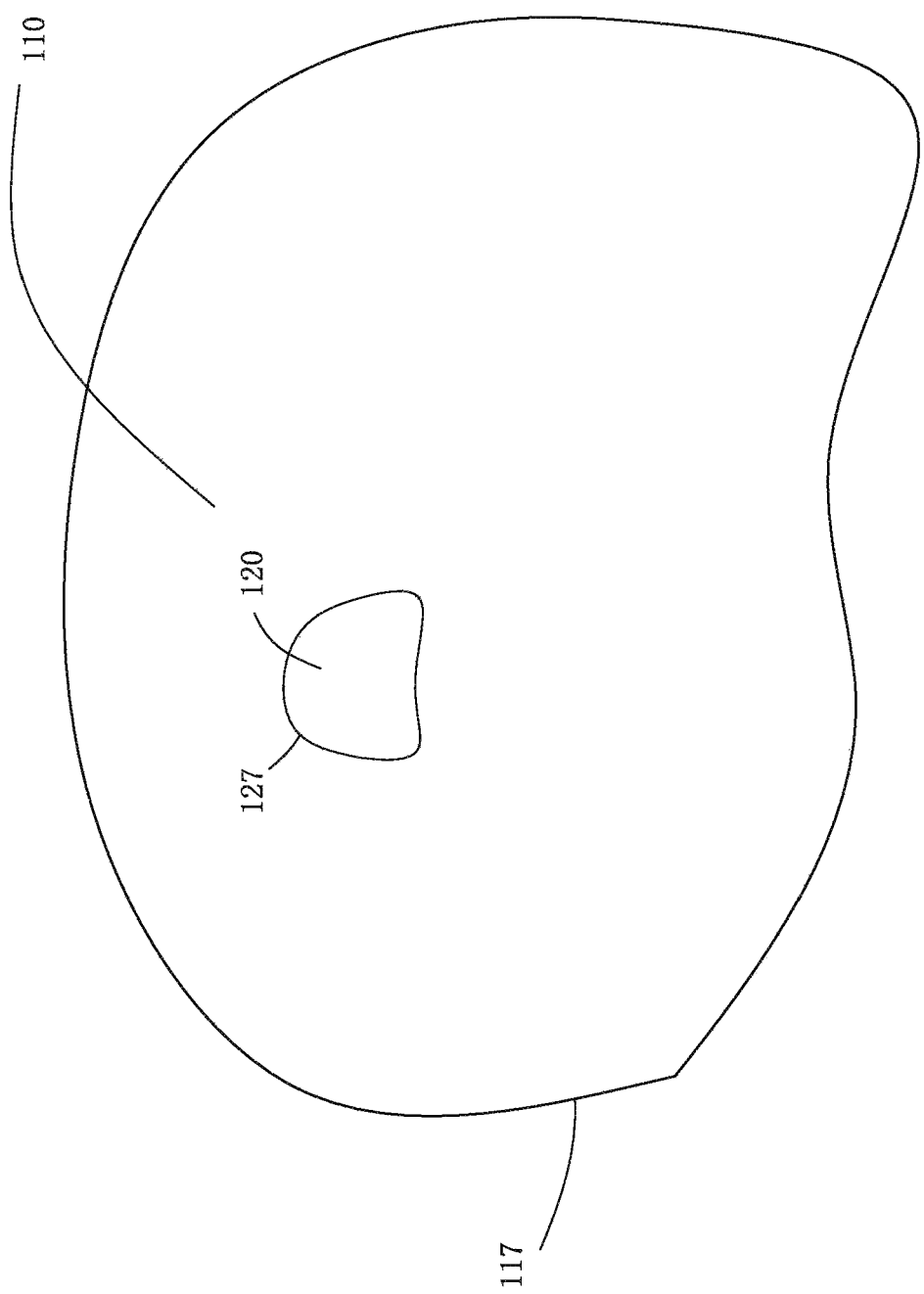
FIG. 13 is a schematic diagram of perimeter pictures on a display according to some embodiments of the present invention.

In one embodiment, as shown in FIG. 11, the perimeter 111 of the working region 110 also comprises a nonworking region 120 defined by an inner perimeter. The actual working region 110 is the region between the perimeter 111 and the inner perimeter 121. In a method according to some embodiments of the invention, the data representing the shape and size of the (outer) perimeter 111 and the data representing the shape and size of the inner perimeter 121 are obtained, and then the area of the working region 110 is calculated based on the above data. The principle is that the area of the working region 110 is the difference by subtracting the area defined by the inner perimeter 121 from the area defined by the perimeter 111. The area of the nonworking region 120 is calculated by the above method for calculating the area of the working region, in a specific example, the data representing the shape and size of the inner perimeter are obtained by the movement of the handheld device 2 along the inner perimeter 121 of the nonworking region with the user, and the area of the nonworking region is calculated according to the data representing the shape and size of the inner perimeter. Further, by the data representing the shape and size of the perimeter, the region area defined by the perimeter 111 is calculated, and the area defined by the perimeter 111 and the area of the nonworking region defined by the inner perimeter 121 are subtracted to obtain the area of the working region 110. FIG. 12 shows a schematic diagram of the perimeter pictures of the working region having a nonworking region displayed on a screen. The working region 110 shown in FIG. 12 is a polygon picture obtained directly according to the lines of the mark points. In other embodiments, as shown in FIG. 13, in order to make the interface viewed by the user more realistic, the adjacent mark points may also be connected by a smooth curve, and the perimeter picture as shown in FIG. 13 is presented on the screen.

Similarly, when a plurality of nonworking regions exist, the areas of other nonworking regions can be calculated according to the above method, and then the actual area of the working region is calculated by subtracting the areas of all nonworking regions from the area defined by the perimeter.

The preset scheduling algorithm may specify that a preset working time corresponds to a range of working areas. For example, for a working region having an area of 600 square meters to 699 square meters, the corresponding working time plan is working for 10 hours and for the working region of 700 square meters to 799 square meters, the corresponding working time plan is working for 15 hours. When the area of the working region is 720 square meters, the processing unit 31 compares the area information with each area interval in the storage unit 32, if the area of the working region is greater than 700 square meters and less than 800 square meters, the processing unit 31 reads the working plan corresponding to the working area interval of 700 square meters to 800 square meters, and the working time this time is planned to be 15 hours. In the preset working time plan provided in the present embodiment, for simplicity of description, only two area intervals are listed as examples, the area interval of each working region is 100 square meters; actually, the number of the area intervals may be more, and the area interval may also be other values except for 100 square meters. For example, the working area of the self-moving device 1 ranges from 0 square meter to 1500 square meters, and 15 area intervals can be divided when each area interval is 100 square meters; the working area of the self-moving device 1 ranges from 0 square meter to 2000 square meters, and 20 area intervals can be divided when each area interval is 100 square meters; the working area of the self-moving device 1 ranges from 0 square meter to 1500 square meters, and 30 area intervals can be divided when each area interval is 50 square meters; and the working area of the self-moving device 1 ranges from 0 square meter to 2000 square meters, and 40 area intervals can be divided when each area interval is 50 square meters.

In addition, the preset scheduling algorithm may also be a preset function with the area information as the variable stored in the storage unit 32. The processing unit 31 substitutes received area information into the preset function, according to the preset function, the time required to complete the work is calculated, the working time plan corresponding to the result is read from the storage unit 32, and the read working time plan is used.

Further, the working time plan may be performed separately in multiple unit times, including multiple sub-working time plans with the same cycle. The length of each unit time cycle may be set according to needs, for example, each unit time cycle may be 8 hours, 12 hours, 24 hours, etc. The duration of the working state of the self-moving device 1 may be the same or different in each unit time cycle. In the present embodiment, when performing the working time plan of 15 hours, the self-moving device 1 may enter a dormant state after working for 7 hours on the first day, enter the dormant state after working for 5 hours on the next day, and work for 3 hours on the third day to complete the work, and the duration of the working state is decreased progressively within each unit time cycle.

Further, the working time plan comprises a first-time working time plan and a maintenance working time plan. When the self-moving device 1 works in the working region for the first time, the working is brand-new, and the workload is larger, therefore the time consumption is long. After the working for the first time is completed, less time is spent every day to maintain the working effects. The maintenance working time plan starts to be executed after the completion of the working for the first time and includes the working time plan of multiple unit time cycles. In the present embodiment, after completing the first-time working time plan, the self-moving device 1 executes the maintenance working time plan, and works for 2 hours per day.

The preset working time plan or formula is based on a path planning mode of the self-moving device 1, and is obtained by experiments or modeling. Looser data are selected when the preset working time plan is made, for example, the longest time required to complete the working in the same area of the working region in the path planning mode, so it is ensured that in all cases, most work can be finished.

The self-moving device 1 shown in FIGS. 1 & 3 comprises a driving module 13 for driving the self-moving device to move, a working module 12 for executing preset work, an energy storage module 15 for supplying energy, a controller 11 for controlling the moving and working of the self-moving device 1, and a housing 17 for containing the above modules.

The driving module 13 comprises motors (not shown) and a driving wheel 131. The driving wheel 131 is usually driven by a plurality of motors, and the rotary speed or steering of each motor is controllable, so that the self-moving device is flexibly steered by adjusting the rotary speed of the driving wheel 131 during movement. The working module 12 is a working module executed by the self-moving device. The working modules of different self-moving devices are different. For example, the working module of an automatic mower may comprise a mowing blade, a cutting motor, etc., for performing the mowing work of the automatic mower; the working module of an automatic dust collector may comprise a dust suction motor, a dust suction port, a dust suction tube, a vacuum chamber, a dust collection device, and the like, which are used to perform a dust suction task. The energy storage module 15 is usually a rechargeable battery that provides power for the operation of the device, e.g. automatic mower or is connected to an external power source for charging. Preferably, the energy storage module 15 has a charging or discharging protection unit capable of protecting the charging or discharging of the energy storage module 15.

In the present embodiment, the handheld device 2, the control module 3, and the self-moving device 1 are in communication connection. In a specific example, a communication, e.g. send and/or receive, module may be disposed in the corresponding device for transmitting the working schedule to the self-moving device 1. In the example shown in FIG. 2, when the control module 3 is fully integrated in the handheld device 2, the handheld device 2 comprises a sending module 26 for sending the working schedule. The self-moving device 1 comprises a receiving module 16 receiving the working schedule. The sending module 26 is configured to transmit the working schedule to the receiving module 16. Either of the sending module 26 and the receiving module 16 or a module combining both may be called a communication module.

Of course, as the control module 3 may occupy a number of different positions, the specific transmitted content and received content of the corresponding communication module may also change accordingly. The operations of area calculation and schedule calculation may be performed at any of the handheld device 2, the server 5 or the self-moving device 1, with the devices and server communicating with each other as necessary. As shown in FIG. 3, the external server 5 comprises a communication module. The control module 3 may be completely located on the external server 5, The communication module of the external server comprises a receiving end 51 and a sending end 52. The area calculation and schedule calculation may be performed at the server 5. For this purpose, the sending module 26 of the handheld device transmits virtual data to the receiving end 51. After the calculation is completed in the external server 5, the working schedule is sent to the receiving module 16 at the self-moving device through the sending end 52, so that the working schedule is obtained by the self-moving device 1. In the present embodiment, the sending end 52 may also send one or both of the area of the working region and the working schedule to the handheld device 2, so that the handheld device 2 obtains the area of the working region and the corresponding working schedule, which may be displayed on the display to be conveniently read by the user.

In another embodiment, the area calculation may be performed at the handheld device, for example by part of the control module 3 calculating the area being located in the handheld device 2. The part calculating the schedule may be located in the self-moving device 1, then correspondingly, the sending module 26 sends the area of the working region to the receiving module 16, and after the self-moving device 1 obtains the area of the working region, the corresponding working schedule is set. In another embodiment, the part of the control module 3 calculating the area is located in the handheld device 2, and the portion calculating the schedule is located in the external server 5. Then correspondingly, the sending module 26 sends the area of the working region to the receiving end 51 of the external server 5. The external server 5 sets the working schedule and sends it to the receiving module 16 through the sending end 52, so that the self-moving device 1 obtains the working schedule. The content transmitted by the corresponding communication module may be determined according to the actual situation. The above is merely an example.

In one embodiment, the perimeter 111 of the working region 110 of the self-moving device 1 is a manually set perimeter line. The working region is a closed interval surrounded by the perimeter line. The perimeter line 3 can prevent the self-moving device 1 from leaving from the working region. In other embodiments, the perimeter may also be a wall, a railing, or the like, and may also be a conductive wire or other signal generating devices such as an electromagnetic signal or an optical signal. A dock is set in the working region, the dock is set on the perimeter line, and when the self-moving device 1 stops working, it stops at the dock and enters a dormant state; when the work needs to be started, it starts again from the dock and enters a working state. The dock can usually provide a charging function to charge the energy storage module 15. When the power of the energy storage module 15 is insufficient, the self-moving device 1 is returned to the dock for charging. The dock can provide guidance and docking for the returning of the self-moving device 1, and the docking can realize wireless guidance by a manner of infrared rays, ultrasonic waves and the like, or the guidance and the docking can be realized by the perimeter line.

According to the automatic working system 100 provided in some embodiments of the present invention, during the initial work, the handheld device 2 only needs to be handheld and moved along the perimeter of the working region to obtain the area of the working region and the working schedule, and then the working schedule is transmitted to the self-moving device 1, the moving and working of the self-moving device 1 are automatically controlled, and a good use experience is brought to the user. In the system, since the self-moving device 1 only needs to have a communication function, it is not necessary to embed a complex calculation program to all the self-moving devices 1 in the system, and the automatic adjustment and working schedule of the automatic working system can be realized by only one handheld device 2 with corresponding functions, for example, the mobile phone of the user, the operation is simple, and the manufacturing cost is saved.

Figure 14:
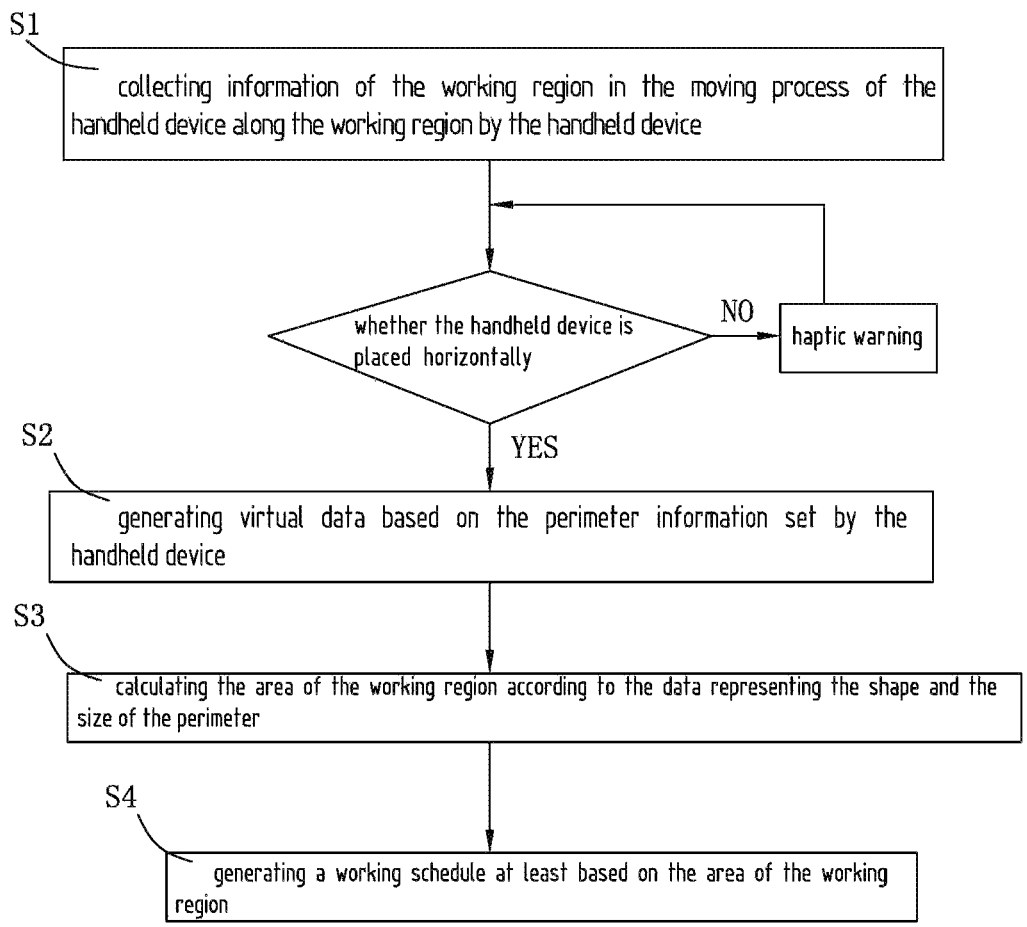
FIG. 14 is a flowchart of an automatic scheduling method according to some embodiments of the present invention.

Referring to FIG. 14, some embodiments of the present invention further provide a method for generating a working schedule of the self-moving device 1, the self-moving device 1 being configured to move and work in a working region, and the method comprises the following steps:

S1: collecting information of the working region, in the moving process of the handheld device 2 along the working region, by the handheld device, the information at least comprising the detected perimeter information of the working region;

S2: generating virtual data, also referred to herein as perimeter data, based on the perimeter information set by the handheld device, the virtual data comprising data representing the shape and the size of the perimeter; and S3: calculating the area of the working region 110 according to the data representing the shape and the size of the perimeter; and S4: generating a working schedule at least based on the area of the working region.

In some embodiments, for example in the step S1, by the camera of the handheld device 2, a plurality of images of the perimeter during the movement of the handheld device 1 are captured. In the step S2: the virtual data are calculated at least based on the related information of the pictures of the perimeter and the command of the user; in a specific example, the perimeter is recorded by a plurality of mark points set along the perimeter, the information of the images comprises the focus lengths of the images and the position differences of the mark points in the multiple images. The distance from the handheld device to the ground is calculated by a focus length, and then the length and the angle of the line between two adjacent mark points are calculated according to the distance from the handheld device to the ground. In a preferred embodiment, the step S2 further comprises updating the distance from the handheld device to the ground in a preset pattern.

In an embodiment, in step S2, generating a plurality of mark points set along the perimeter to record the perimeter comprises the following steps: providing a start signal in response to a command from the user to record the first mark point of a picture of said perimeter, for example, the user triggers the start trigger to generate the start signal; providing a finish signal in response to a command from the user to recording the last mark point of the picture of said perimeter, for example, the user triggers the finish trigger to generate the finish signal; presenting the perimeter on a display, wherein the start trigger and the finish trigger automatically set a plurality of mark points in the moving process of the handheld device according to a preset pattern; and connecting the first mark point and the last mark point to set a closed perimeter. In a specific example, the user triggers the start signal at the starting point, and records the first mark point of the perimeter picture, the user holds the handheld device 2 to move along the perimeter 111, a plurality of mark points are automatically set until the user reaches the ending point, the finish signal is triggered to record the last mark point of the perimeter picture, and then all the adjacent points are connected to each other while the first mark point and the last mark point are connected to form the closed perimeter picture. The abovementioned preset pattern may be predetermined time and/or predetermined distance, that is, a plurality of mark points are automatically set every predetermined time and/or every predetermined distance.

In one preferred embodiment, the method for generating the working schedule further comprises: if the device is not placed horizontally in the moving process, then sending a reminder to the user. The above reminder is preferably the haptic warning set by the handheld device. In other embodiments, the above reminder may also be sound, pictures or information, etc., or the combination of above various reminders. In the preferred embodiment, the method further comprises: sending the working schedule to the self-moving device from the handheld device, of course, in other embodiments, the handheld device may also send the working schedule to the external server 5, and then the working schedule is sent to the self-moving device by the external server; or the working schedule is obtained in the external server, and the working schedule is directly sent to the self-moving device by the external server. The sending process can be determined according to an actual condition, and the above is merely an example.

Figure 15:
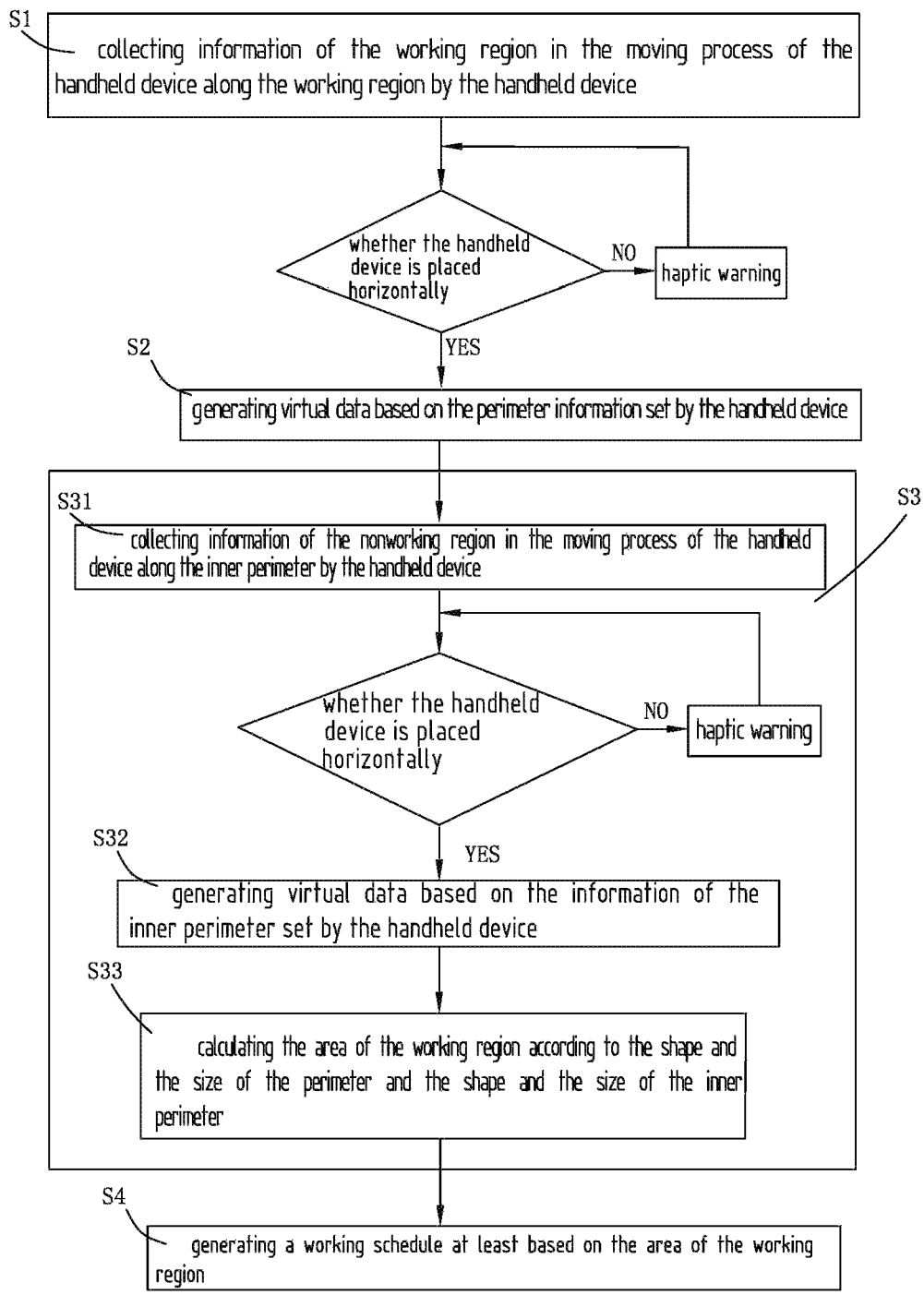
FIG. 15 is a flowchart of an automatic scheduling method according to some embodiments of the present invention.

In another embodiment, referring to FIG. 15, the perimeter 111 of the working region 110 also comprises a nonworking region 120 without a need of working therein, the nonworking region 120 is defined by an inner perimeter 121 and the step S3 comprises:

S31: collecting information of the nonworking region 120 in the moving process of the handheld device along the inner perimeter 121 by the handheld device, the information at least comprising the detected information of the inner perimeter;

S32: generating virtual data based on the information of the inner perimeter set by the handheld device, the virtual data comprising data representing the shape and the size of the inner perimeter 121; and S33: calculating the area of the working region according to the shape and the size of the perimeter 111 and the shape and the size of the inner perimeter 121.

In one specific embodiment, in the step S31, by the camera of the handheld device 2, a plurality of images of the inner perimeter during the movement of the handheld device 1 are captured. In the step S32: the virtual data are calculated at least based on the related information of the images of the perimeter and the command of the user; the inner perimeter is recorded by a plurality of mark points set along the inner perimeter, the information of the images comprises the focus lengths of the images and the position differences of the mark points in the multiple images. The distance from the handheld device to the ground is calculated by a focus length, and then the length and the angle of the line between two adjacent mark points are calculated according to the distance from the handheld device to the ground. In the preferred embodiment, the step S32 further comprises updating the distance from the handheld device to the ground in a preset pattern.

In an embodiment, in step S32, generating a plurality of mark points set along the inner perimeter to record the perimeter comprises the following steps: providing a start signal in response to a command from the user to record the first mark point of a picture of said inner perimeter, for example, the user triggers the start trigger to generate the start signal; providing a finish signal in response to a command from the user to recording the last mark point of the picture of said inner perimeter, for example, the user triggers the finish trigger to generate the finish signal; presenting the inner perimeter on a display, wherein the start trigger and the finish trigger automatically set a plurality of mark points in the moving process of the handheld device according to a preset pattern; and connecting the first mark point and the last mark point to set a closed inner perimeter. The user triggers the start signal at the starting point, and records the first mark point of the inner perimeter picture, the user holds the handheld device 2 to move along the inner perimeter 121, a plurality of mark points are automatically set until the user reaches the ending point, the finish signal is triggered to record the last mark point of the inner perimeter picture, and then all the adjacent points are connected to each other while the first mark point and the last mark point are connected to form the closed perimeter picture. The abovementioned preset pattern may be predetermined time and/or predetermined distance, that is, a plurality of mark points are automatically set every predetermined time and/or every predetermined distance.

In another embodiment, in the step S1, the coordinates of the handheld device 2 in the moving process are detected by a positioning unit of the handheld device. In some embodiments, the positioning unit comprises at least one of a satellite positioning apparatus, an inertial navigation apparatus, an electronic compass, a gyroscope, and the like. The satellite positioning apparatus comprises a GPS positioning device or a Beidou positioning device. In the specific embodiment, the positioning unit comprises a GPS positioning device and an inertial navigation apparatus. The handheld device 2 obtains the coordinate information of the handheld device 2 during the movement through the GPS positioning device and the inertial navigation apparatus, because the GPS accuracy is relatively low, usually, the absolute position of the handheld device 2 during movement is firstly located through the GPS, then the relative position of each waypoint during the movement of the handheld device 2 is obtained through the inertial navigation apparatus, and the more accurate coordinate information of the handheld device 2 during the movement is obtained through the GPS positioning device and the inertial navigation apparatus. As shown in FIG. 7, during the movement of the handheld device 2 along the perimeter 111, the perimeter setting unit 37 records the perimeter by setting the mark points along the way. The perimeter setting unit 37 sets the virtual data of the perimeter according to the coordinate information of the handheld device 2 in the moving process. The virtual data comprise the data representing the shape and size of the perimeter. For example, the virtual data comprise the position coordinates of each mark point.

According to the method for automatic scheduling in some embodiments of the present invention, during the first time work, the handheld device 2 only needs to be handheld and moved along the perimeter of the working region to obtain the working schedule, and then the working schedule is transmitted to the self-moving device 1, the moving and working of the self-moving device 1 are automatically controlled, and a good use experience is brought to the user. In the method, since the self-moving device 1 only needs to have a communication function, it is not necessary to embed a complex calculation program to all the self-moving devices 1 in the system, and the automatic scheduling of the self-moving device can be realized by only one handheld device 2 with corresponding functions, for example, the mobile phone of the user, the operation is simple, and the manufacturing cost is saved. Besides, the method is applicable for the automatic scheduling of all self-moving devices having the communication function, and the application is wide.

An embodiment of the present invention further provides a self-moving device moving and working in the working region 110. The self-moving device 1 comprises a driving module 13 driving the self-moving device to move, a working module 12 executing preset work, an energy storage module 15 supplying energy, a controller 11 for controlling the moving and working of the self-moving device 1, and a housing 17 for containing the above modules. The self-moving device 1 further comprises a receiving module receiving the working schedule. The controller controls the self-moving device 1 to execute the work according to the working schedule set by the method for generating the working schedule. The self-moving device 1 in the present embodiment is simple in structure, low in cost and wide in application.

Figure 16:
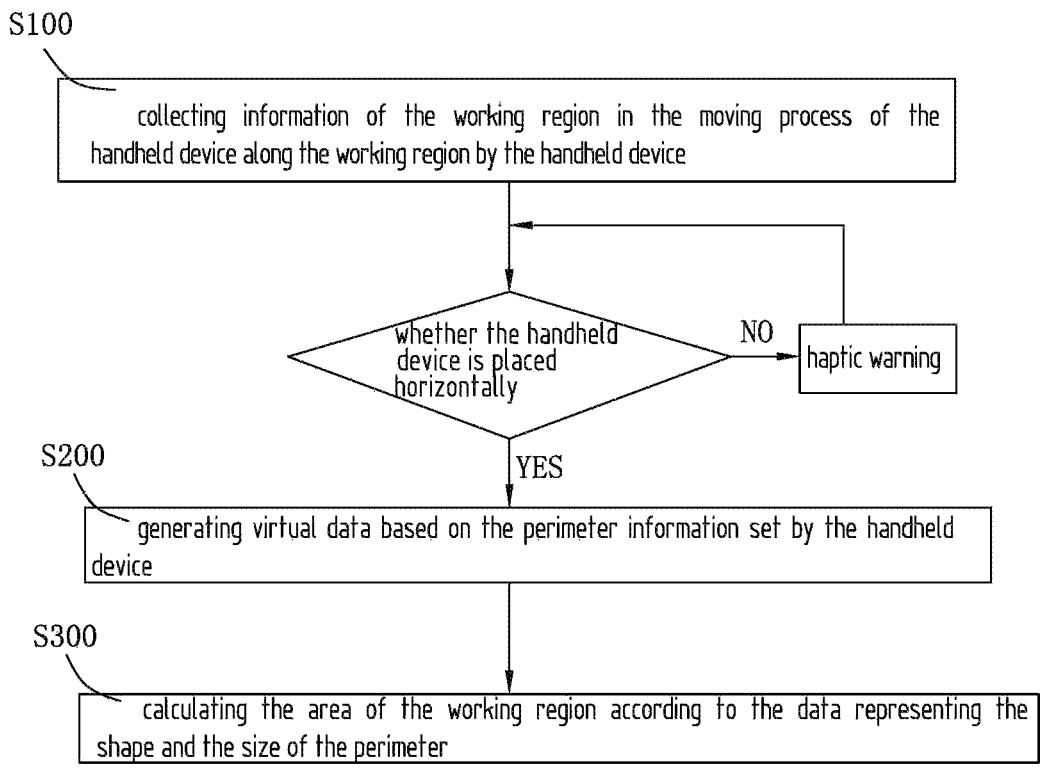
FIG. 16 is a flowchart of a method for calculating the area of a working region according to some embodiments of the present invention.

Referring to FIG. 16, an embodiment of the present invention further provides a method for calculating the area of a working region of the self-moving device 1, the self-moving device 1 is configured to move and work in a working region, and the method comprises the following steps:

S100: collecting information of the working region by the handheld device in the moving process of the handheld device 2 along the working region, the information at least comprising the detected perimeter information of the working region;

S200: generating virtual data based on the perimeter information set by the handheld device, the virtual data comprising data representing the shape and the size of the perimeter; and S300: calculating the area of the working region 110 according to the data representing the shape and the size of the perimeter.

In a specific embodiment, in the step S100, by the camera of the handheld device 2, a plurality of images of the perimeter during the movement of the handheld device 1 are captured. In the step S200: the virtual data are calculated at least based on the related information of the images of the perimeter and the command of the user; the perimeter is recorded by a plurality of mark points set along the perimeter, the information of the images comprises the focus lengths of the images and the position differences of the mark points in the multiple images. The distance from the handheld device to the ground is calculated by a focus length, and then the length and the angle of the line between two adjacent mark points are calculated according to the distance from the handheld device to the ground. In the preferred embodiment, the step S200 further comprises updating the distance from the handheld device to the ground in a preset pattern.

In the preferred embodiment, in step S200, generating a plurality of mark points set along the perimeter to record the perimeter comprises the following steps: providing a start signal in response to a command from the user to record the first mark point of a picture of said perimeter, for example the user triggers the start trigger to generate the start signal; providing a finish signal in response to a command from the user to recording the last mark point of the picture of said perimeter, for example the user triggers the finish trigger to generate the finish signal; presenting the perimeter on a display, wherein the start trigger and the finish trigger automatically set a plurality of mark points in the moving process of the handheld device according to a preset pattern; and connecting the first mark point and the last mark point to set a closed perimeter. The user may trigger the start signal at the starting point, and records the first mark point of the perimeter picture, the user holds the handheld device 2 to move along the perimeter 111, a plurality of mark points are automatically set until the user reaches the ending point, the finish signal is triggered to record the last mark point of the perimeter picture, and then all the adjacent points are connected to each other while the first mark point and the last mark point are connected to form one closed perimeter picture. The abovementioned preset pattern may be predetermined time and/or predetermined distance, that is, a plurality of mark points are automatically set every predetermined time and/or every predetermined distance. By the pattern of the predetermined time and/or predetermined distance, the data are refreshed continuously, such that the precision of calculated results is greatly improved.

In the preferred embodiment, the method for generating the area of the working region further comprises: if the handheld device is not placed horizontally in the moving process, then sending a reminder to the user. The user is reminded when the handheld device 2 is not placed horizontally, and the non-horizontal placement, the distorted result as well as the poor effect of large calculation error caused therefrom are avoided. The above reminder is preferably the haptic warning set by the handheld device. In other embodiments, the above reminder may also be sound, pictures or information, etc., or the combination of above various reminders.

In a preferred embodiment, the method further comprises displaying the area of the working region on the display, to be conveniently read by the user. In another embodiment, the handheld device sends the area of the working region of the self-moving device. Of course, in other embodiments, the handheld device may also send the area of the work region to the external server 5, the area of the working region is stored on the external server 5, or the area of the working region is sent to the self-moving device by the external server; or the area of the working region is obtained in the external server, and the area of the working region is directly sent to the self-moving device by the external server. The sending process can be determined according to an actual condition, and the above is merely an example.

The above embodiment is a preferred embodiment of the present invention. By directly detecting the perimeter through a camera, the data representing the shape and size of the perimeter are acquired, and other detection modes, such as the mode of satellite coordinate positioning, for acquiring the data representing the shape and size of the perimeter are avoided. Due to trees or other obstacles, the positioning accuracy is low, and the final calculation result is lower than the accuracy of this solution. In addition, in the present embodiment, by displaying the corresponding features on the display, when the user operates, by combining the virtuality and the reality, the sense of reality and sense of integration of the use experience will be multiplied, thereby improving the use experience.

Figure 17:
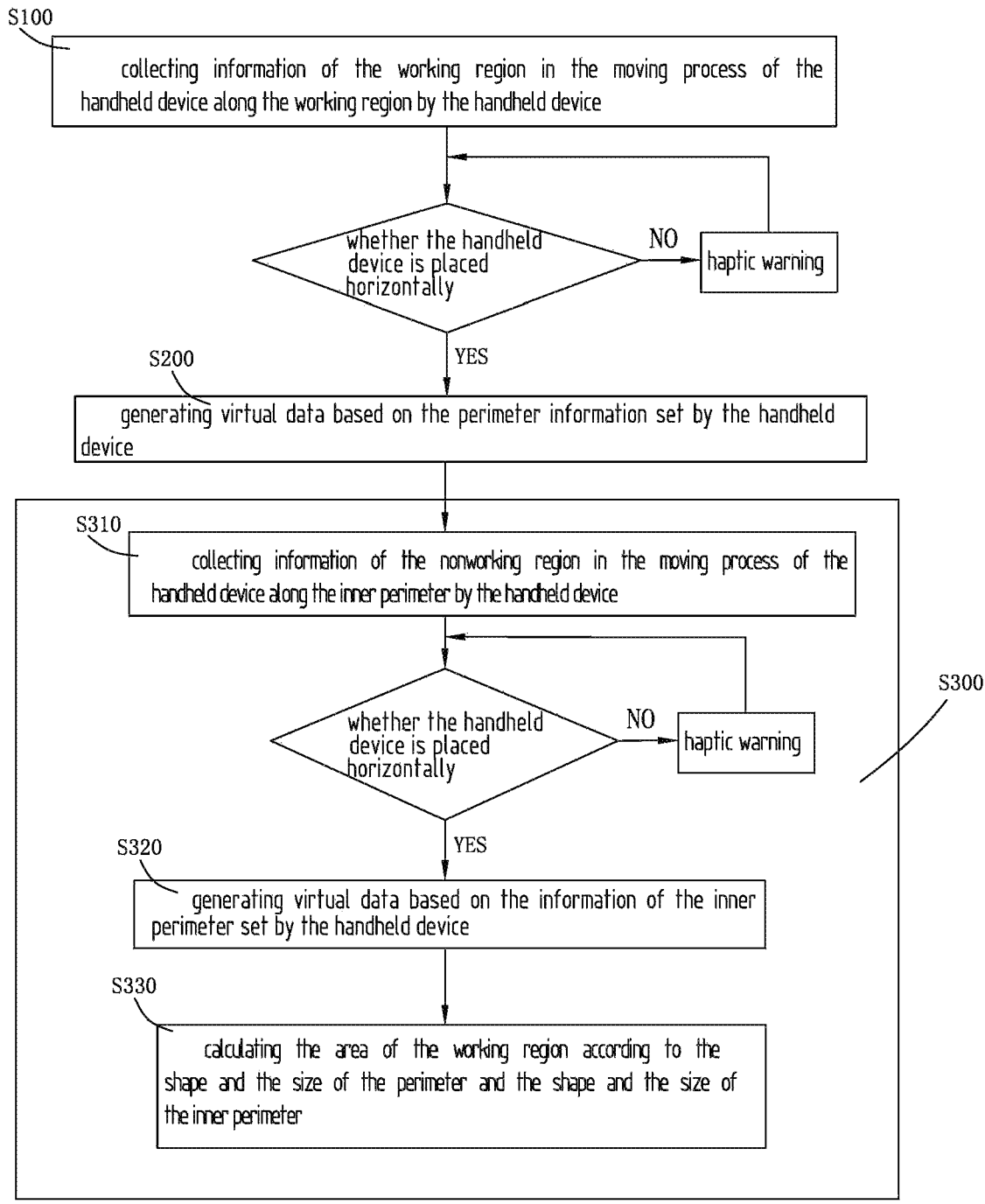
FIG. 17 is a flowchart of a method for calculating the area of a working region according to some embodiments of the present invention.

In another embodiment, as shown in FIG. 17, the perimeter 111 of the working region 110 also comprises a nonworking region 120 without a need of working therein, the nonworking region 120 is defined by an inner perimeter 121 and the step S300 comprises:

S310: collecting information of the nonworking region 120 in the moving process of the handheld device along the inner perimeter 121 by the handheld device, the information at least comprising the detected information of the inner perimeter;

S320: generating virtual data based on the information of the inner perimeter set by the handheld device, the virtual data comprising data representing the shape and the size of the inner perimeter 121; and S330: calculating the area of the working region according to the shape and the size of the perimeter and the shape and the size of the inner perimeter 121.

In the specific embodiment, in the step S310, by the camera of the handheld device 2, a plurality of images of the inner perimeter during the movement of the handheld device 1 are captured. In the step S320: the virtual data are calculated at least based on the related information of the pictures of the perimeter and the command of the user; the inner perimeter is recorded by a plurality of mark points set along the inner perimeter, the information of the images comprises the focus lengths of the images and the position differences of the mark points in the multiple images. The distance from the handheld device to the ground is calculated by a focus length, and then the length and the angle of the line between two adjacent mark points are calculated according to the distance from the handheld device to the ground. In a preferred embodiment, the step S320 further comprises updating the distance from the handheld device to the ground in a preset pattern.

In a preferred embodiment, in step S320, generating a plurality of mark points set along the inner perimeter to record the perimeter comprises the following steps: providing a start signal to receive the command of the user to record an first mark point in pictures of the inner perimeter; providing a finish signal to receive the command of the user to record a last mark point in pictures of the inner perimeter; presenting the inner perimeter on a display, wherein the start trigger and the finish trigger automatically set a plurality of mark points in the moving process of the handheld device according to a preset pattern; and connecting the first mark point and the last mark point to set a closed inner perimeter. For example, the user triggers the start signal at the starting point, and records the first mark point of the inner perimeter pictures, the user holds the handheld device 2 to move along the inner perimeter 121, a plurality of mark points are automatically set until the user reaches the ending point, the finish signal is triggered to record the last mark point of the inner perimeter pictures, and then all the adjacent points are connected to each other while the first mark point and the last mark point are connected to form the closed perimeter picture. The abovementioned preset pattern may be predetermined time and/or predetermined distance, that is, a plurality of mark points are automatically set every predetermined time and/or every predetermined distance.

In another embodiment, in the step S100, the coordinates of the handheld device 2 in the moving process are detected by a positioning unit of the handheld device. The positioning unit may comprise at least one of a satellite positioning apparatus, an inertial navigation apparatus, an electronic compass, a gyroscope, and the like. The satellite positioning apparatus comprises a GPS positioning device or a Beidou positioning device. In some embodiments, the positioning unit comprises a GPS positioning device and an inertial navigation apparatus. The handheld device 2 obtains the coordinate information of the handheld device 2 during the movement through the GPS positioning device and the inertial navigation apparatus, because the GPS accuracy is relatively low, usually, the absolute position of the handheld device 2 during movement is firstly located through the GPS, then the relative position of each waypoint during the movement of the handheld device 2 is obtained through the inertial navigation apparatus, and the more accurate coordinate information of the handheld device 2 during the movement is obtained through the GPS positioning device and the inertial navigation apparatus. As shown in FIG. 7, during the movement of the handheld device 2 along the perimeter 111, the perimeter setting unit 37 records the perimeter by setting the mark points along the way. The perimeter setting unit 37 sets the virtual data of the perimeter according to the coordinate information of the handheld device 2 in the moving process. The virtual data comprise the data representing the shape and size of the perimeter. For example, the virtual data comprise the position coordinates of each mark point.

According to the method for automatically calculating the area of the region in a specific embodiment of the present invention, during the first-time work, the handheld device 2 only needs to be handheld and moved along the perimeter of the working region to obtain the area of the working region, the operation is simple, and a good use experience is brought to the user. Besides, in an embodiment of the present method, there is further provided a method for calculating the area of a working region with a nonworking region therein. The actual area of the working region is directly calculated by holding the handheld device 2 to walk along the perimeter 111 of the working region 110 and the inner perimeter 121 of the nonworking area 120 for a circle respectively. The method is simple to operate, the manufacturing cost is saved, the result is precise, and the application is wide.

Some embodiment of the present invention further provide a computer-readable medium, on which a computer program is stored, and when the computer program is executed by a processor, the above method for generating a working schedule and/or the method for calculating the area of a working region is realized.

Some embodiments of the present invention further provide a computer program product, on which a computer program command is stored, and when the computer program command is executed by a processor, the above method for generating a working schedule and/or the method for calculating the area of a working region is realized.

Some embodiments of the present invention further provide a computer device, comprising a processor and a memory, wherein the processor operates the program corresponding to an executable program code by reading the executable program code stored in the memory, to realize the above method for generating a working schedule and/or the method for calculating the area of a working region.

Those skilled in the art could conceive that the present invention can also have other implementing manners, but as long as they adopt the technical essence same as or similar to the present invention, or any easy-to-conceive changes or substitutions made based on the present invention are all in the protective scope of the present invention.

The present invention is not limited to the listed specific embodiment structures, and all structures based on the thought of the present invention belong to the protective scope of the present invention.

What is claimed is:

1. A method for calculating the area of a working region of a self-moving device, wherein the self-moving device is configured to move and work in the working region, and the method comprises:
    collecting information on the working region by a handheld device in a process of moving the handheld device along the working region, the information at least comprising detected perimeter information of the working region;
    generating perimeter data based on the perimeter information collected by the handheld device, the perimeter data comprising data representing the shape and the size of the perimeter; and
    calculating the area of the working region according to the data representing the shape and the size of the perimeter.

2. The method according to claim 1, wherein the handheld device comprises a camera and:
    the collecting comprises capturing a plurality of images of the perimeter in the moving process of the handheld device by a camera of the handheld device; and
    the generating at least comprises: calculating the perimeter data at least based on related information of the images of the perimeter.

3. The method according to claim 2, wherein the information of the images comprises a focus length and the generating comprises recording the perimeter by a plurality of mark points set along the perimeter, calculating a distance from the handheld device to the ground by a focus length, and then calculating the length and angle of a line between adjacent two mark points according to the distance from the handheld device to the ground.

4. The method according to claim 3, wherein the generating comprises refreshing the distance from the handheld device to the ground according to a preset pattern.

5. The method according to claim 3, wherein that the information of the images comprises focus lengths of the images and the position differences of the mark points in the multiple images.

6. The method according to claim 3, wherein the generating comprises:
    providing a start signal in response to a command from the user to record the first mark point of a picture of said perimeter; and
    providing a finish signal in response to a command from the user to record the last mark point of the picture of said perimeter and/or to finish recording a mark point.

7. The method according to claim 6, further comprising displaying the perimeter, the start trigger and the finish trigger in a picture of the perimeter.

8. The method according to claim 6, wherein the generating comprises connecting the first mark point and the last mark point to set a closed perimeter.

9. The method according to claim 6, wherein the generating comprises, according to a preset pattern, automatically generating a plurality of mark points in the moving process of the handheld device.

10. The method according to claim 9, wherein the generating according to a preset pattern comprises generating the mark points every predetermined time and/or every predetermined distance.

11. The method according to claim 9, wherein the method further comprises:
    if the device is not placed horizontally in the moving process, then sending a reminder to the user.

12. The method according to claim 1, wherein the working region further comprises a nonworking region defined by an inner perimeter therein, and further comprising:
    collecting information of the nonworking region in the moving process of the handheld device along the inner perimeter by the handheld device, the information at least comprising the detected information of the inner perimeter;
generating inner perimeter data based on the information of the inner perimeter set by the handheld device, the inner perimeter data comprising data representing the shape and the size of the inner perimeter; and
    calculating the area of the working region according to the shape and the size of the perimeter and the shape and the size of the inner perimeter.

13. The method according to claim 1, wherein the collecting comprises: detecting the coordinates in the moving process of the handheld device by a positioning unit of the handheld device.

14. The method according to claim 1, further comprising generating a working schedule of said self-moving device based at least on said area of the working region.

15. The method according to claim 1, further comprising sending the area of the working region from said handheld device.

16. A computer-readadable medium, wherein a computer program is stored thereon, and when the computer program is executed by a processor, the method for generating a working schedule according to claim 1 is realized.

17. An automatic working system, comprising a self-moving device for moving and working within a working region, a handheld device and a control module, wherein:
    said handheld device comprises:

a detecting module for detecting perimeter information of said working region while the handheld device is moved along the perimeter of the working region;
an input module for receiving a command from the user to detect said perimeter information;
said control module comprises:
a perimeter setting unit for generating perimeter data representing the shape and the size of said perimeter based on said perimeter information;
an area calculating unit for calculating the area of said working region based on said perimeter data and
a scheduling unit for generating a working schedule at least based on the area of said working region;
said self-moving device comprises:
a working module for performing predetermined work;
a driving module for supporting and driving said self-moving device to move;
a controller connecting with said working module and said driving module, for controlling said self-moving device to work according to said working schedule.

18. The automatic working system according to claim 17, wherein:
said detecting module comprises a camera for capturing a plurality of images of the perimeter of said working region while the handheld device moves; and
said perimeter setting unit is configured to calculate said perimeter data at least based on the information of said images.

19. The automatic working system according to claim 18, wherein said perimeter setting unit is configured to record the perimeter by setting a plurality of mark points along said perimeter as the handheld device moves along the perimeter, and calculating the length and angle of lines between the adjacent mark points.

20. The automatic working system according to claim 1, wherein said control module is integrated in said handheld device.

* * * * *